United States Patent Office 3,348,208
Patented Oct. 17, 1967

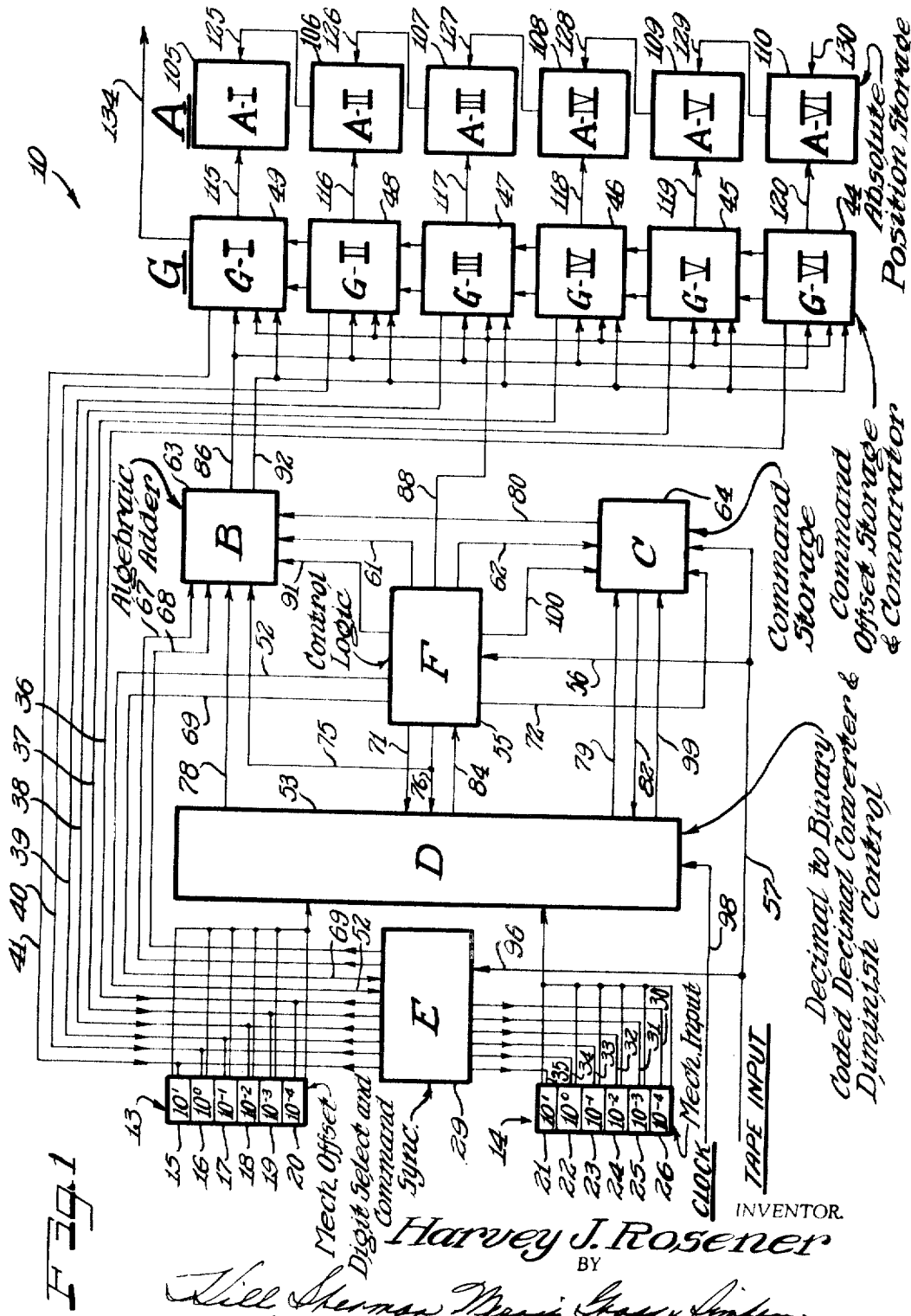

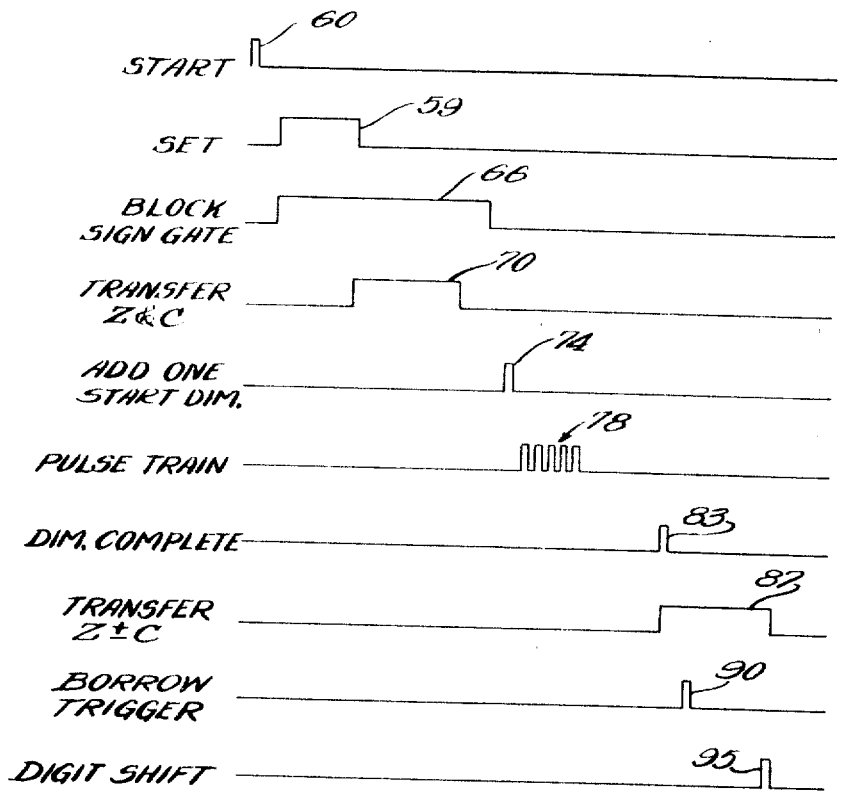

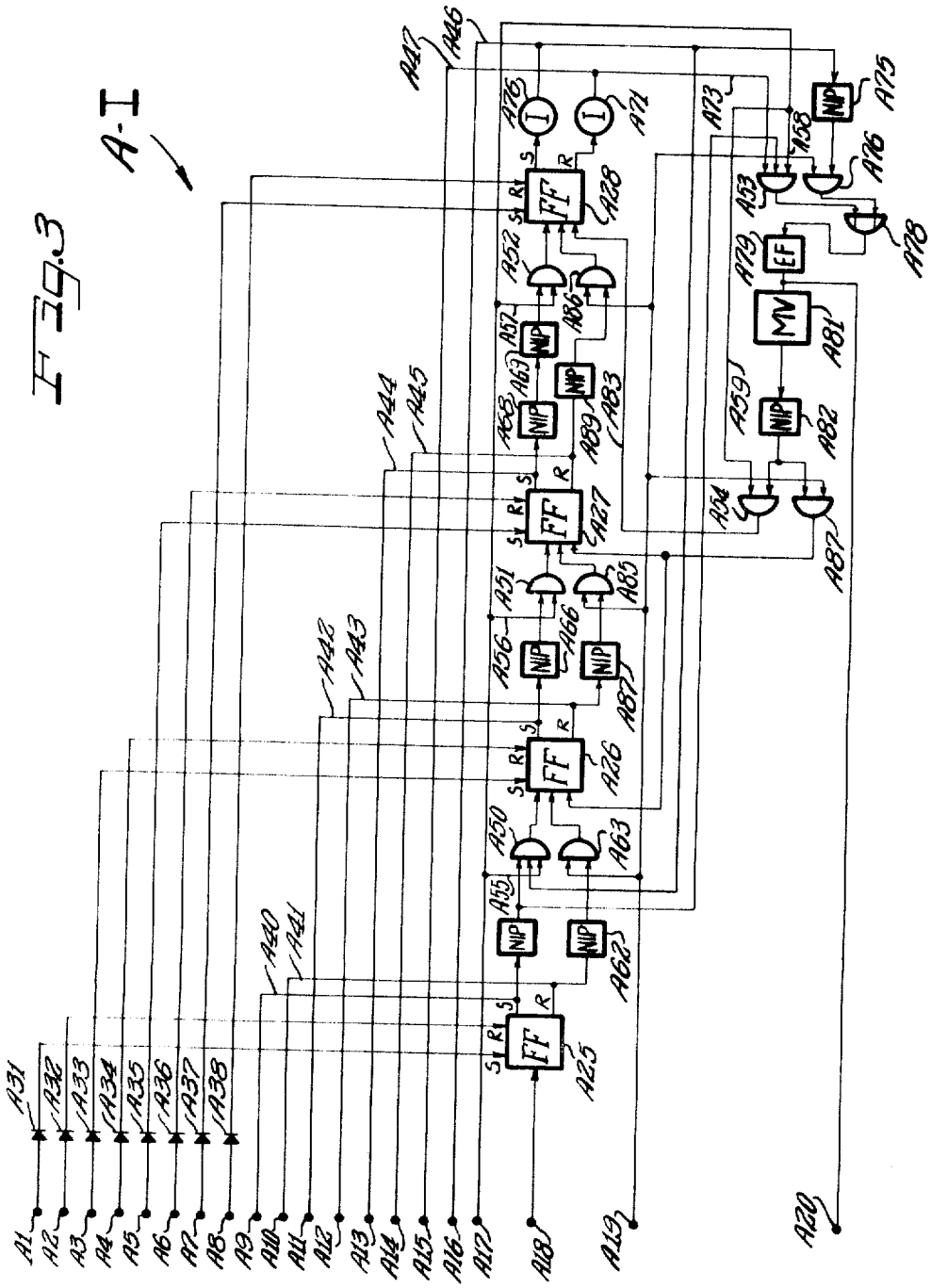

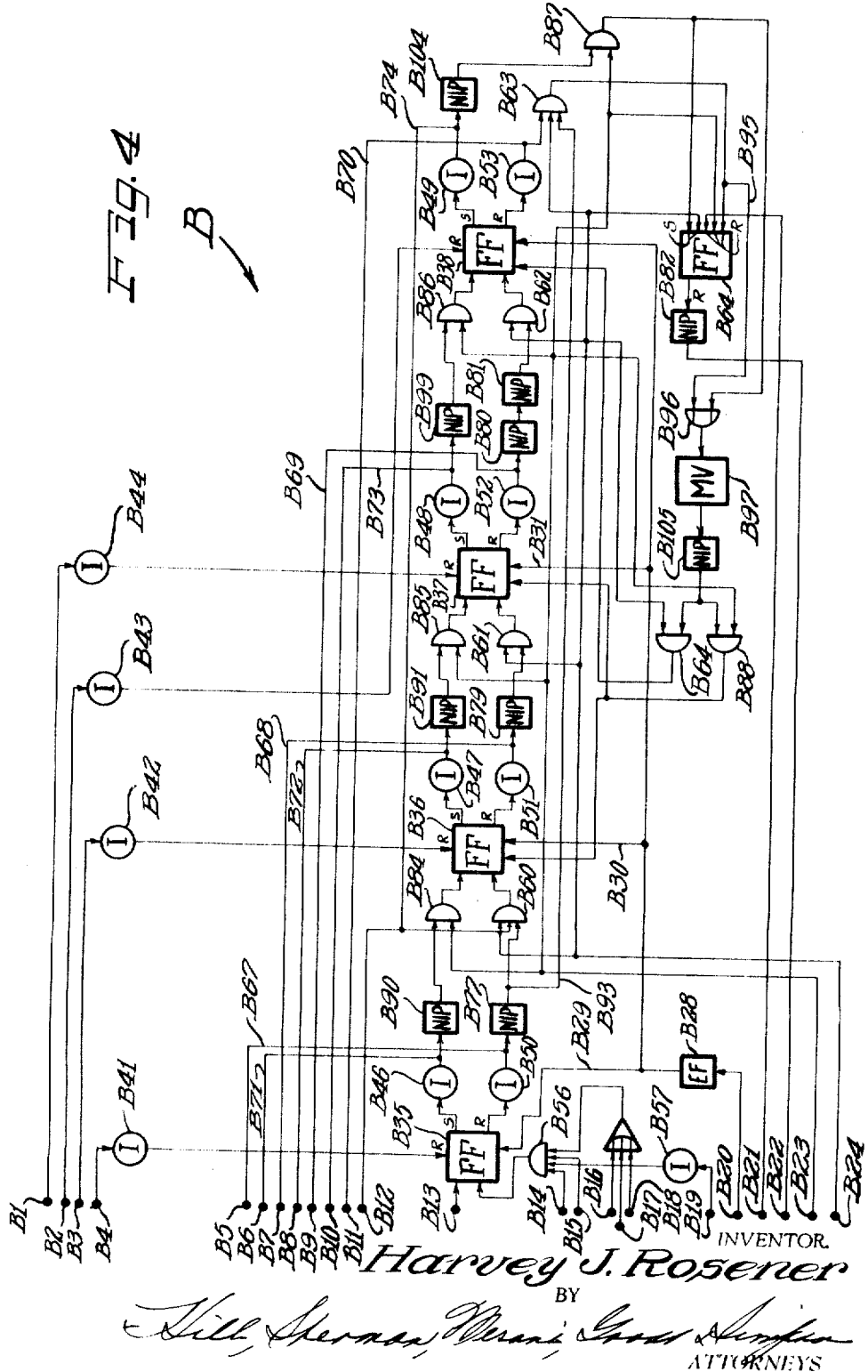

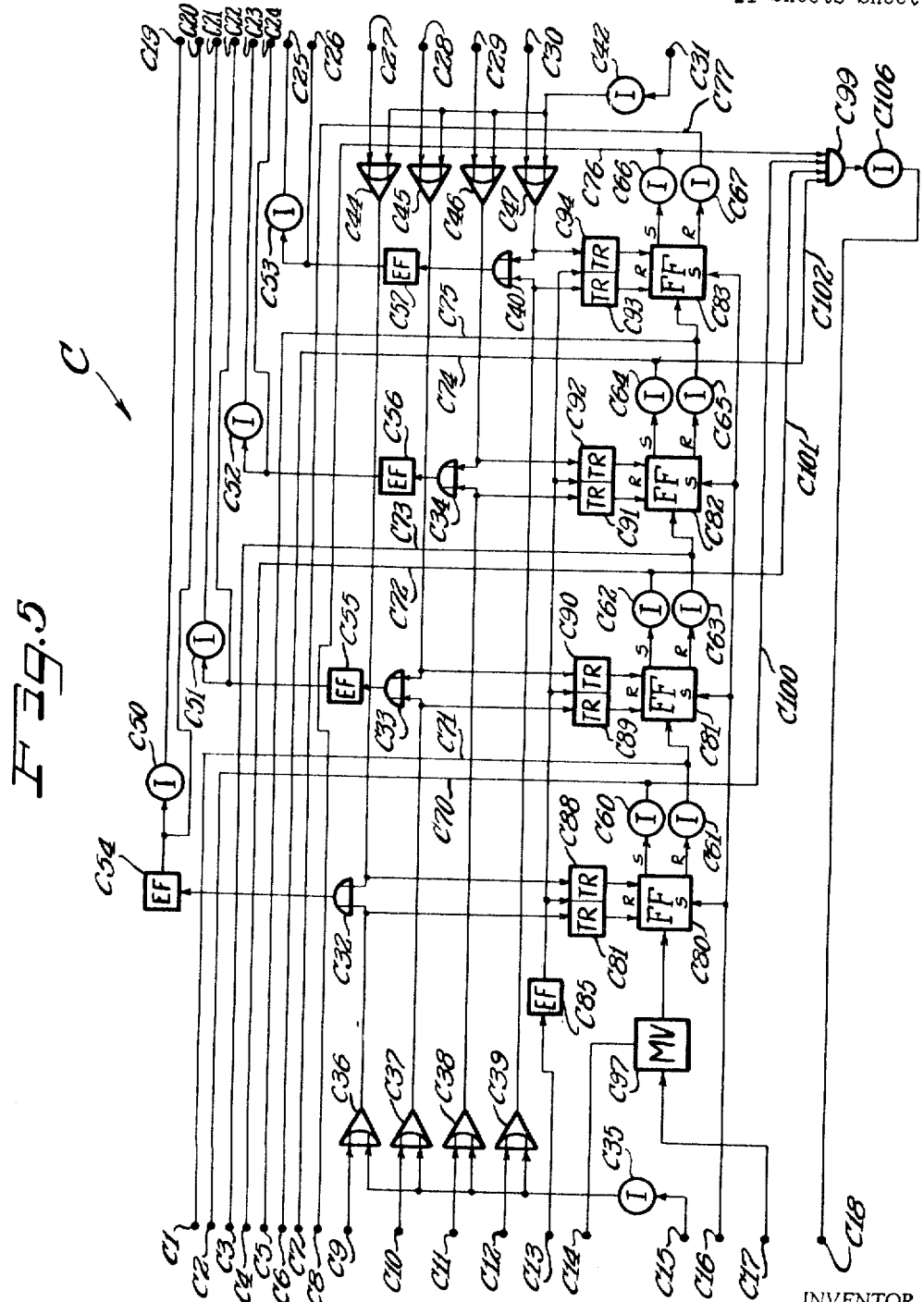

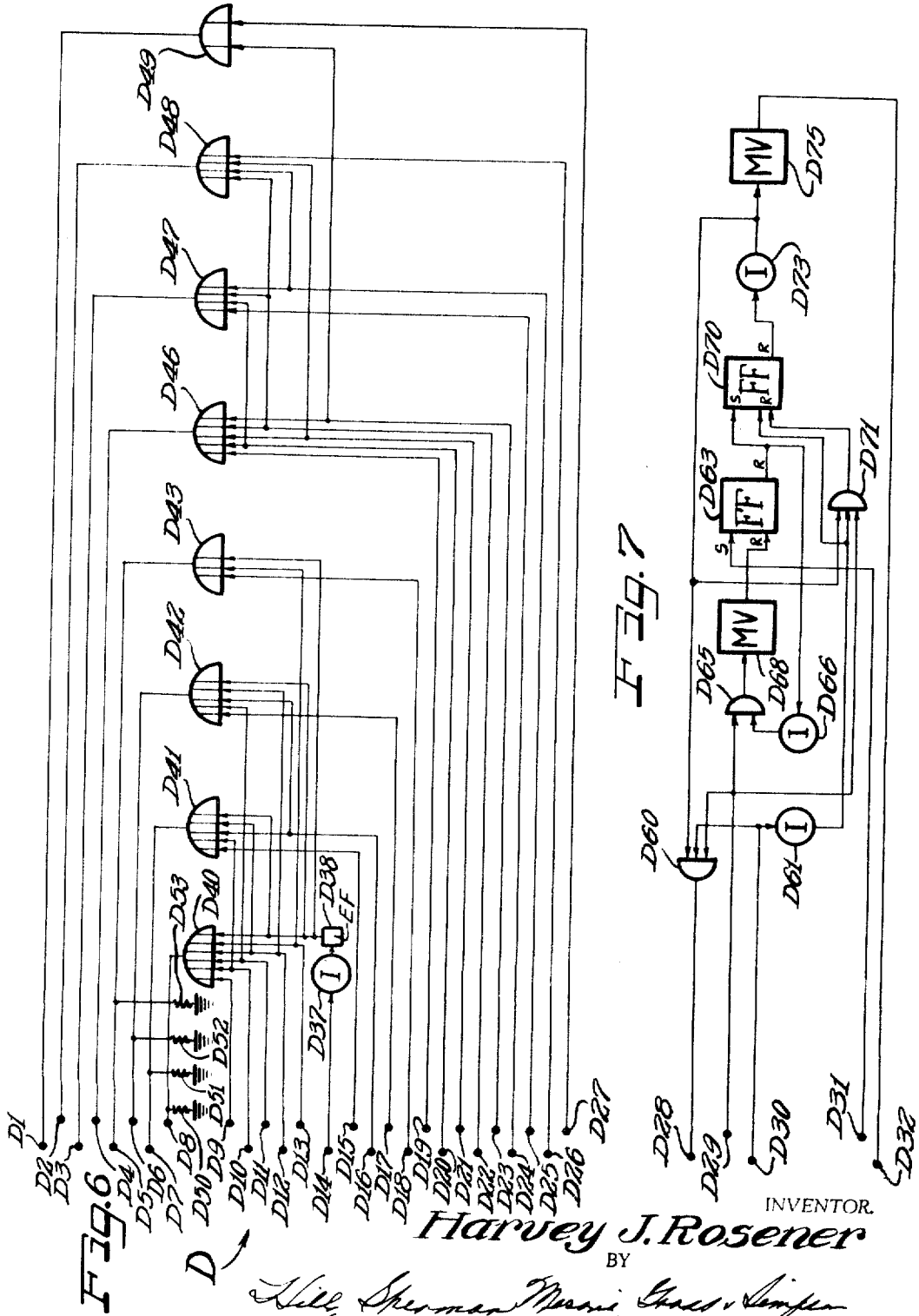

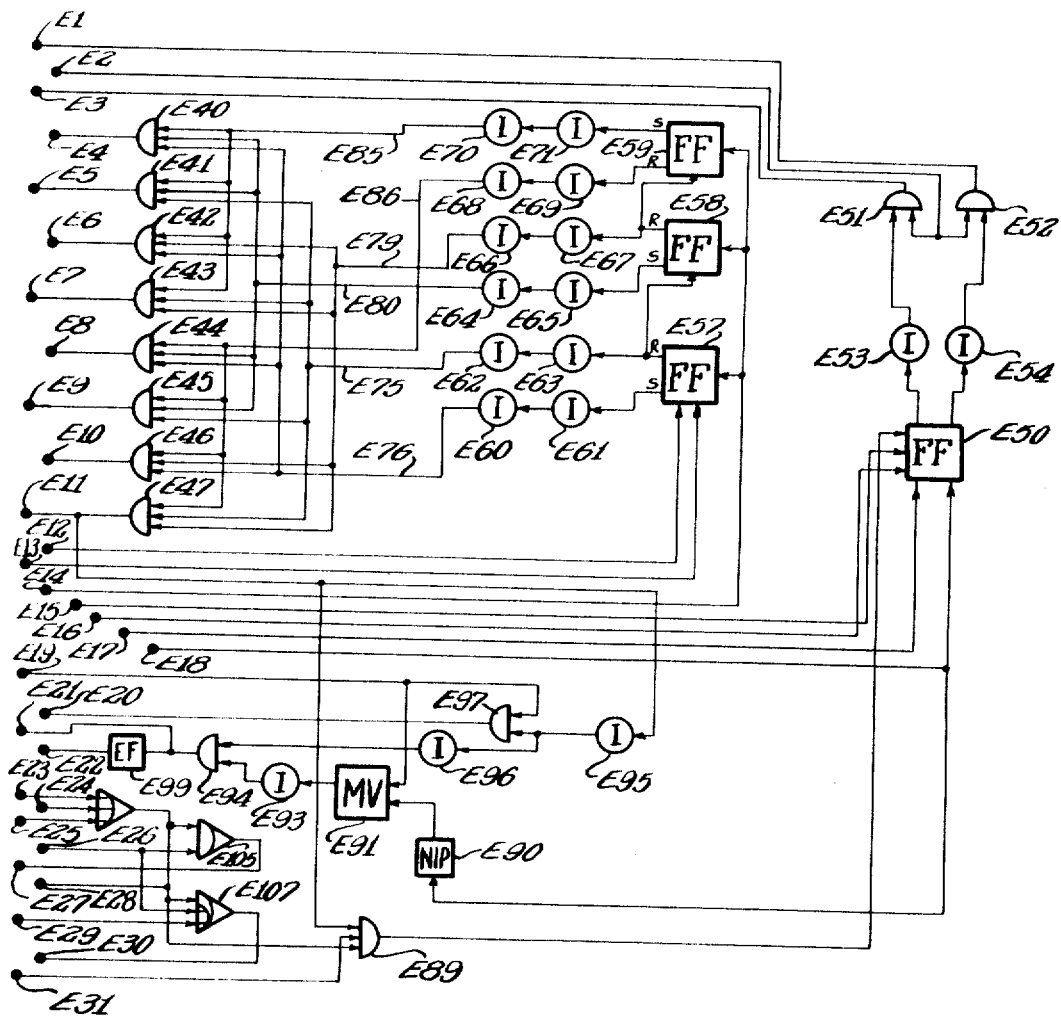

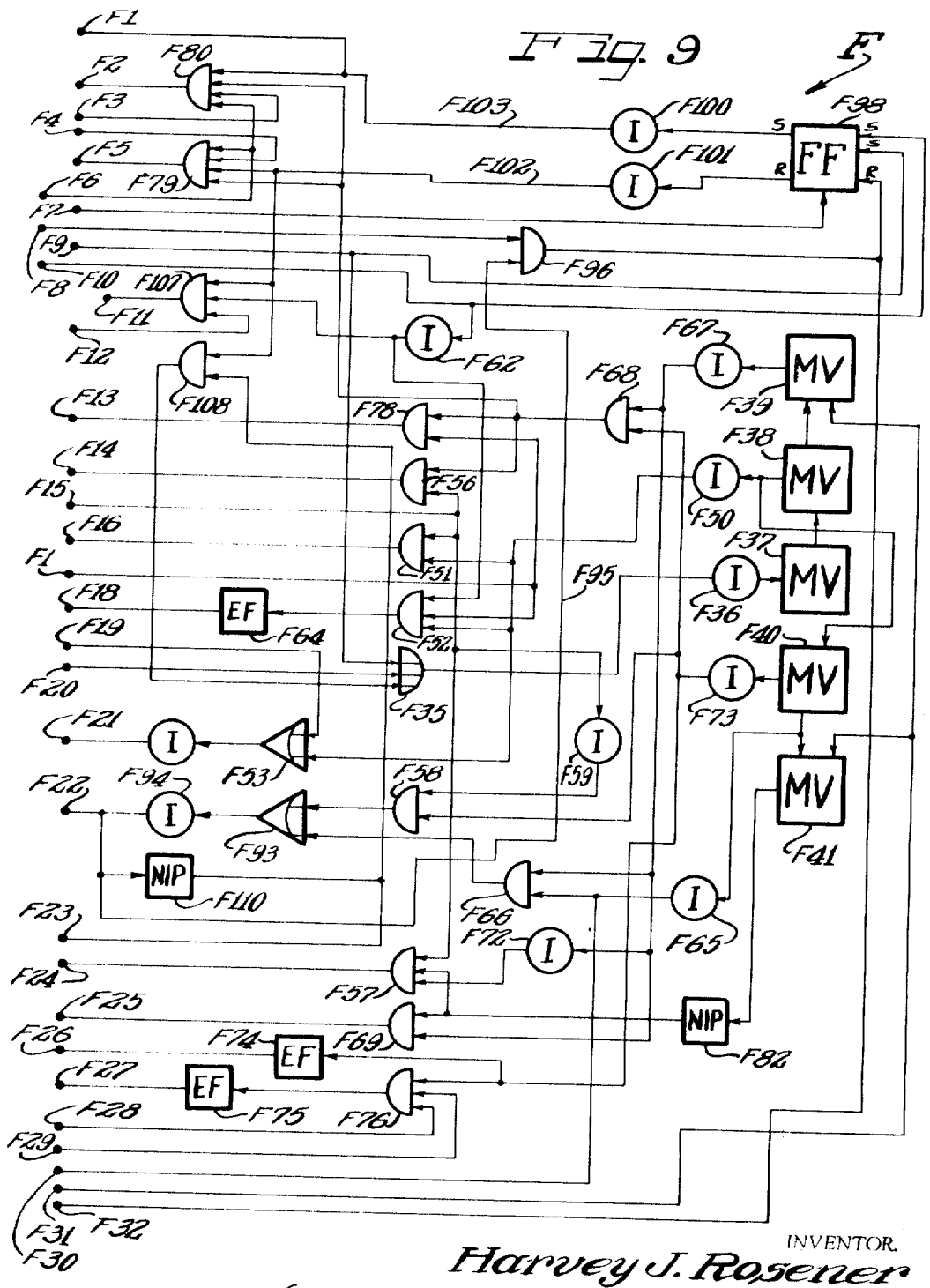

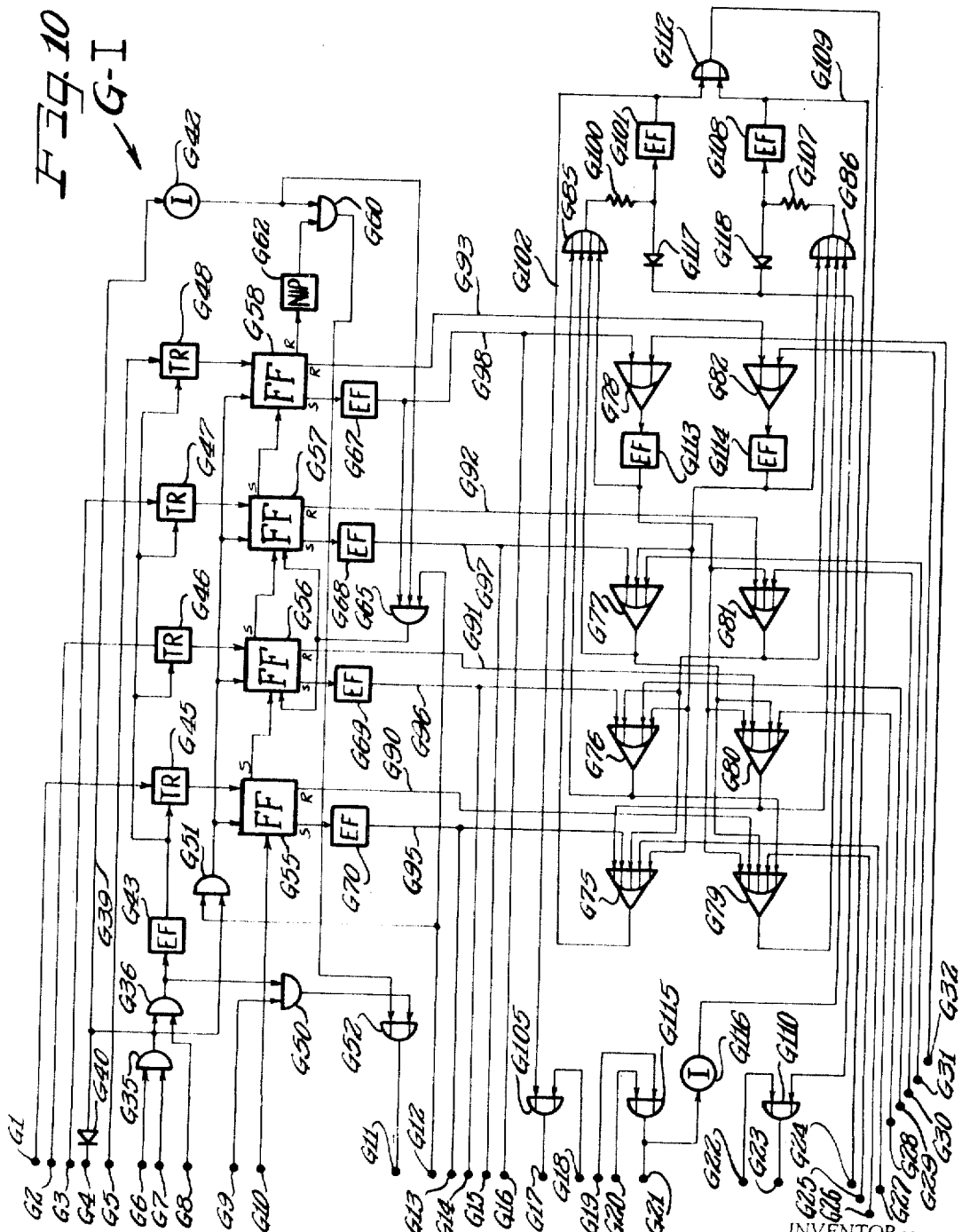

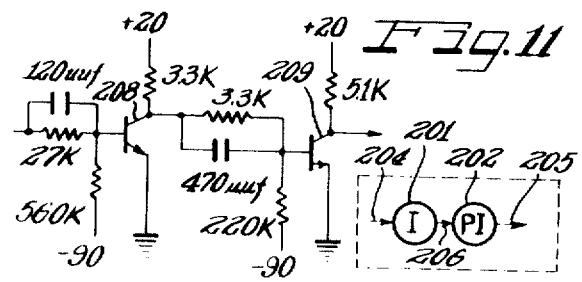
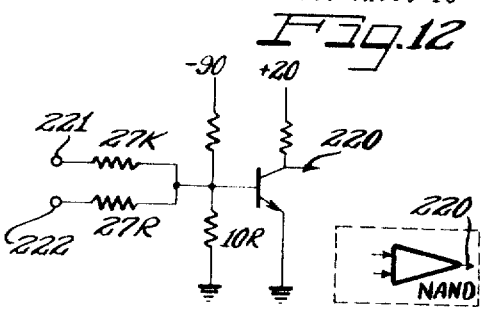
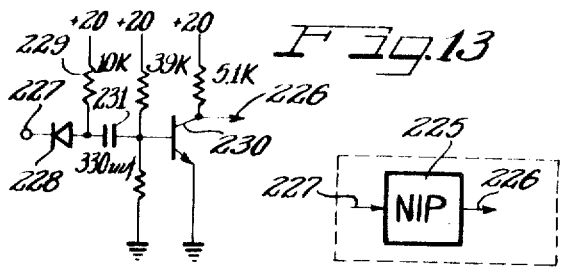
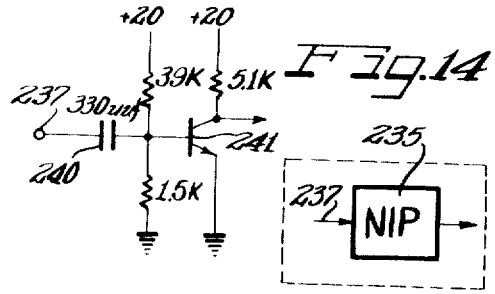
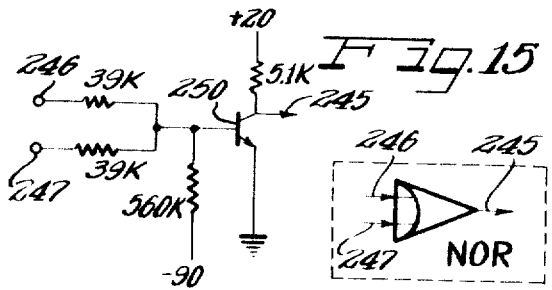
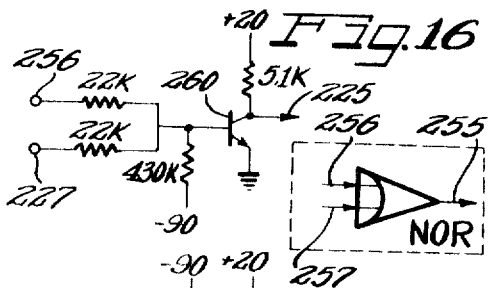
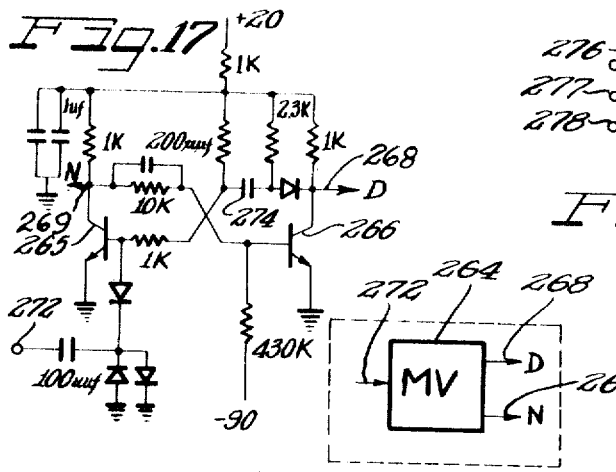
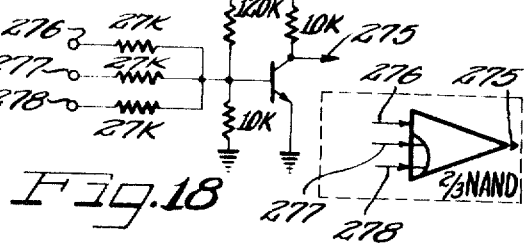

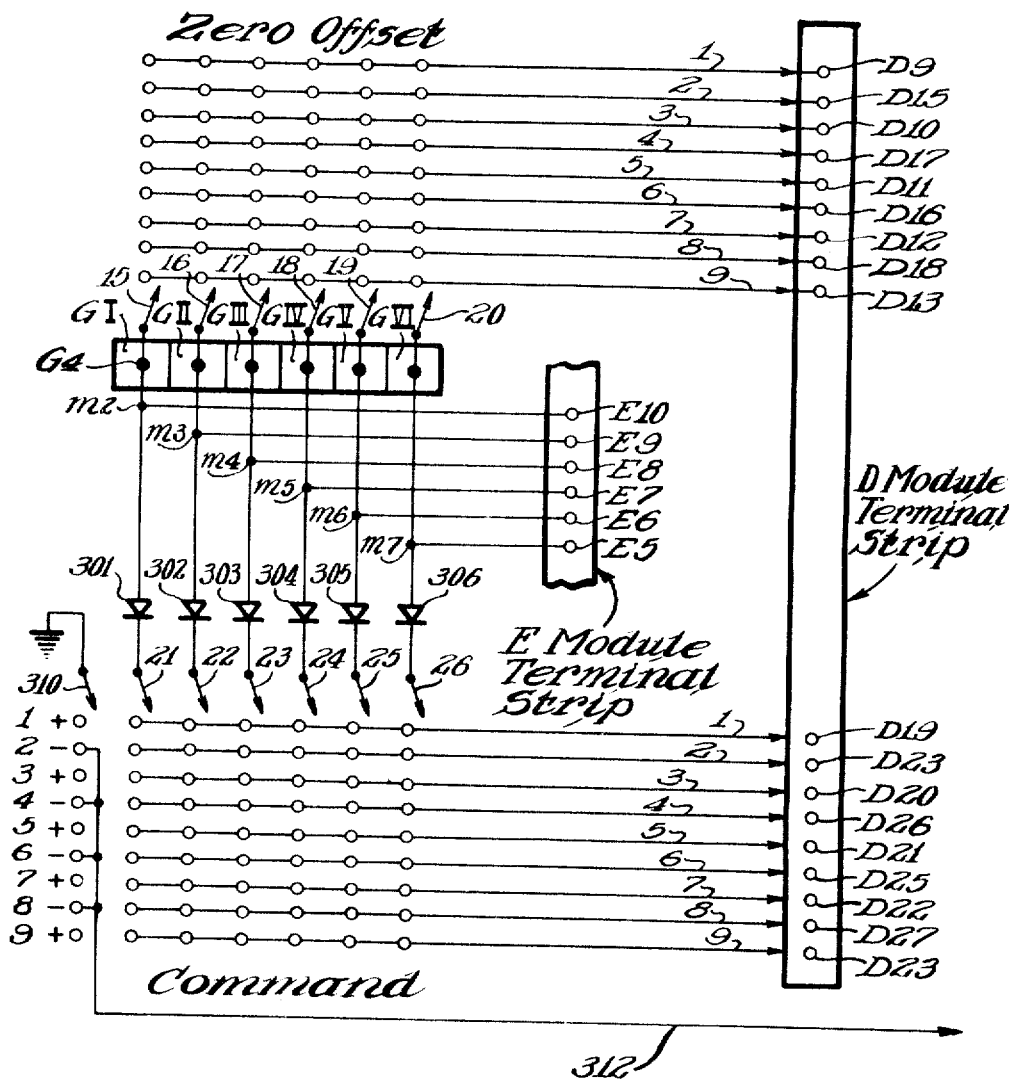

3,348,208
NUMERICAL POSITIONING CONTROL SYSTEM
Harvey J. Rosener, Dayton, Ohio, assignor, by mesne assignments, to The Bunker-Ramo Corporation, Stamford, Conn., a corporation of Delaware
Filed Apr. 1, 1964, Ser. No. 356,437
16 Claims. (Cl. 340—172.5)

This invention relates to a numerical control system and particularly to a numerical positioning control system for processing commands relating to one or more axes of movement of a machine tool or the like.

The system of the present invention is especially adapted to generate positioning signals in accordance with the algebraic sum of an input positioning command, a zero offset input and an absolute position feedback.

A preferred embodiment of this invention provides means for obtaining the algebraic sum of two numbers by processing the respective most significant digits thereof first, thence the next most significant digits and so on until all the digit positions of the two numbers have been processed. In a system such as this, a command number can be added algebraically to a manual offset number in a digit by digit fashion and the result for each digit position stored in a semi-static storage. The stored information may represent the end point position to which a machine tool part is to be moved along a given axis, and may always be a positive number. The information placed into the semi-static storage may be compared with a number in an absolute position storage register (which may indicate the instantaneous absolute position of the machine tool part along the given axis) to detect the sign of any difference between the two stored values and thus to indicate the direction of any required movement.

It is therefore an object of the present invention to provide a novel numerical control system.

It is a further object of this invention to provide an improved numerical control system particularly adapted to process a command input number which may be positive or negative along with a zero offset input number and and a feedback absolute position number so as to generate a positioning signal for a machine tool axis or axes or the like.

A subsidiary object is to provide an improved numerical control system of the foregoing type which is capable of accepting input commands from either an automatically scanned input medium such as punched tape or from a manually adjusted input.

A further subsidiary object is to provide a numerical control system in accordance with any of the foregoing objects which is of low cost in comparison with a numerical contouring system.

Another object of the invention is to provide an arithmetic operation system particularly adapted for numerical positioning systems which enables the use of relatively simple and inexpensive components and affords an overall design of reduced complexity and of correspondingly reduced space requirements.

Still another object of the invention is to provide a novel numerical positioning control system having means for offsetting input commands by any selected value.

A further object of the invention resides in the provision of a novel arithmetic operation system capable of selectively adding or subtracting one input number with respect to another, digit by digit beginning with the most significant digit position.

Another and further object of the invention resides in the provision of a numerical positioning control system having a manually or electronically adjusted zero offset feature and which may readily incorporate additional features such as circular interpolation, internal feedrate override acceleration and deceleration, and pulse feed control.

Still another and further object of the invention is to provide a system as described in any of the foregoing objects which is able to satisfy the requirements of binary coded decimal absolute position readout transducers as well as other transducers.

Yet a further object of the invention is to provide a numerical control system which is capable of receiving the most significant digit of an input dimension command first and of superimposing an adjustable offset on such input command without the necessity for an intermediate storage of such input command.

Yet another and further object of the invention resides in the provision of a system in accordance with any of the foregoing objects which fully conforms with EIA codes and is of unique simplicity in relation to the functions to be performed thereby.

It is still a further object of this invention to provide an arithmetic operation system having a minimum number of components and which is particularly adapted for use in numerical positioning control systems and the like.

Other objects, features and advantages of the present invention will be apparent from the following detailed description taken in conjunction with the accompanying drawings, a brief description of the several views of which follows immediately hereafter.

On the drawings:

FIGURE 1 is a diagram showing the interconnections of circuit modules A through G to provide a preferred embodiment of numerical control system in accordance with the present invention (preferred circuits for the individual modules being illustrated in FIGURES 3 through 10);

FIGURE 2 is a timing diagram illustrating the logic sequence during the processing of one digit position in the preferred system;

FIGURE 3 is a block diagram of one of the A modules which comprises part of a preferred absolute position storage circuit for the system of FIGURE 1;

FIGURE 4 is a block diagram of the B module for the system of FIGURE 1 which comprises a preferred algebraic adder circuit;

FIGURE 5 is a block diagram of a preferred command storage component (module C) for the system of FIGURE 1;

FIGURE 6 is a block diagram of a preferred decimal number to binary number conversion unit which may form part of module D in the system of FIGURE 1;

FIGURE 7 is a block diagram of a preferred diminish start and diminish stop control circuit which may also be part of module D in the illustrated embodiment;

FIGURE 8 is a block diagram of a preferred digit select and command sync circuit (module E) which may form part of the system of FIGURE 1;

FIGURE 9 is a block diagram of a preferred control logic circuit (module F) for the system in FIGURE 1;

FIGURE 10 is a block diagram of a preferred command-offset storage and comparator unit which may constitute one of the G modules in the illustrated embodiment;

FIGURE 11 is a schematic diagram of a preferred pair of cascade inverters which are used in FIGURE 8;

FIGURE 12 is a schematic diagram of a preferred NAND circuit which is used in the module E;

FIGURE 13 is a schematic diagram of a preferred Negative Input Pulser having a series diode resistor input and is used for certain pulser circuits on modules A and B;

FIGURE 14 is a schematic diagram of a preferred Negative Input Pulser having a capacitor input and is used for the other pulser circuits on modules A, B, E, F and G;

FIGURE 15 is a schematic diagram of one preferred NOR gate circuit which can be used for certain NOR gates on modules B, C, E, F and G;

FIGURE 16 is a schematic diagram of another preferred NOR gate circuit which can be used for the other NOR gates on modules B, C, E, F and G;

FIGURE 17 is a schematic diagram of a preferred multivibrator having positive and negative output signals of different time durations which correspond to different values of capacitors, and which is used in modules A, B, C, D, E and F; and FIGURE 18 is a schematic diagram of a preferred ⅔ NAND gate circuit which is used in module E.

FIGURE 19 is a schematic diagram of a preferred manual switching arrangement to selectively insert the desired digit value in each digit position used in the system of FIGURE 1.

*Introduction*

FIGURE 1 is a block diagram representation of a preferred embodiment of arithmetic control system in accordance with the present invention. The letters A through G designate respective circuit modules or series of modules for carrying out the functions indicated by the associated labels. The individual modules are illustrated in FIGURES 3 through 10. FIGURE 1 will serve to show directly the interconnections between the individual modules. While the division of the circuitry of the preferred embodiment into modules is a great convenience in the construction and servicing of the system, it will be appreciated that such modular construction is not essential to the invention.

Where a particular function is provided by a series of modules, the successive modules are differentiated by roman numerals following the module letter. The series of modules is then collectively identified by the module letter without any suffix.

In the description of the various modules, each reference numeral applied to a part on a given module is prefixed by the letter designating such module. This enables the immediate identification of the module on which such part is located and thus facilitates the location of the various parts in the drawings.

In order to facilitate location of the various modules in the block diagram of FIGURE 1, and to graphically illustrate the relationship between the following FIGURES 3–10 of the drawings, it has been considered preferable to include in the blocks representing the various modules only the identifying letter and suffix, if any. Suitable functional labels have, however, been associated with the respective blocks by means of lead lines.

In the following description decimal numbers have in general been spelled with lower case letters while the binary numbers ONE and ZERO are spelled in capital letters. Similarly, the terms AND, NAND, OR and NOR are spelled with capital letters when referring to the well known logical gating circuits. Such gate circuits are represented by uniform symbols throughout the drawings. The symbol designated A50 in FIGURE 3 is representative of the AND gate symbol; the symbol designated E105 in FIGURE 8 stands for a NAND gate; the symbol designated A78 in FIGURE 3 is typical for an OR gate; and the symbol designated C36 in FIGURE 5 is of the type representing a NOR gate. The symbol designated E107 in FIGURE 8 is, of course, a hybrid circuit requiring a negative gating signal at the input line and a negative gating signal at either one of the lower input lines for signal transmission. This gate E107 is termed herein a NAND–NOR gate.

The flip-flops have their output lines labeled "R" (standing for reset) and "S" (standing for set) to indicate that the output at a given line is "high" when the flip-flop is in the indicated reset or set condition. The flip-flop A25 which will typify all flip-flops, has five input lines connected thereto. The lines marked R and S refer to inputs which are used to place a binary coded number in a module in parallel fashion, and accordingly will set or reset the appropriate flip-flops to indicate a binary coded number in the module. However, the three input lines on the side of the flip-flop A26 are used to both set and reset the flip-flop A26 depending on the state of the flip-flop before receiving a signal. In other words, a signal received from the inputs on the side of the flip-flop will change the state of the flip-flop.

The term "line" as used herein will, of course, comprehend a multiple conductor line, and the number of conductors required for a given line will be apparent to those skilled in the art.

*A specific numerical example of the addition operation and of the subtraction operation in the preferred embodiment*

The overall purpose and functioning of the illustrated preferred embodiment may best be understood by reference to the following specific numerical examples.

*Example of arithmetic addition by the system of Figure 1*

In the first example it is assumed that it is desired to offset a positive command input (+19.4281) to the numerical control system of FIGURE 1 by an offset number (52.6319), so that the command number is to be arithmetically added to the offset number. In accordance with the preferred embodiment, the numbers are to be added digit-by-digit beginning with the highest significant digit position so that the system will not require intermediate storage for a block of input information but may process input commands character-by-character as they are received from an input medium such as punched tape. The processing of successive characters from a block of information on the tape, in the illustrated system, takes place during respective time intervals which are arbitrarily designated by the characters m1 through m7 for the purposes of the present description.

During time interval m1, an axis letter such as X (designating a certain machine axis) may be transferred to active storage.

Also during time interval m1 sign information from the tape is stored (in this example a positive indicating signal would be stored).

During time m2, the highest significant digits of the numbers in question are added.

Successive digit positions are added during respective times m3 through m7 (for the case of input numbers having a maximum of six significant figures).

The addition process may be diagrammed as indicated below.

| Time interval | (m2) | (m3) | (m4) | (m5) | (m6) | (m7) |
|---|---|---|---|---|---|---|
| Offset | 5 | 2. | 6 | 3 | 1 | 9 |
| Command | 1 | 9. | 4 | 2 | 8 | 1 |
| Add one | 1 | 1. | 1 | 1 | 1 | ----- |
| Stored result | 7 | 2. | 1 | 6 | 0 | 0 |
| Borrow delete | ----- | 1 | 1 | ----- | 1 | 1 |
| Modified result | 7 | 2. | 0 | 6 | 0 | 0 |

During time interval m2, the highest significant digit (five) of the offset number and the highest significant digit (one) of the command number and a one are added arithmetically to produce a resultant highest significant digit (seven) which is stored.

In the illustrated embodiment, a borrow storage is provided which is effective to reduce the stored result for a given digit position by one in the absence of a "borrow delete" signal from the next lower digit position; the "borrowing" of a one takes place at the end of the time interval for the next lower digit position and serves to remove the one previously added where necessary to obtain a valid result. At the end of time interval m2 the borrow storage remains in a borrow state.

During time interval m3, the second highest significant digit (two) of the offset number and the second highest significant digit (nine) of the command number and a one are added to produce a result which in the example would be the twelve. However, only the two is placed into storage. A borrow delete signal is produced in the second digit position since the sum of the offset digit and the command digit and the one added thereto is ten or greater and the borrow delete signal shifts the borrow storage to a non-borrow state, so that a one will not be borrowed.

The existence of this borrow delete signal as a result of the addition in the second most significant digit position is indicated by the presence of the numeral 1 in the "borrow delete" row of the foregoing addition diagram. This borrow delete pulse or signal is, as previously explained, transmitted to the borrow storage to prevent a one from being borrowed from the result obtained with respect to the most significant digit position.

When the third significant digit (six) of the offset number and the third significant digit (four) of the command number and a one are added (during time interval m4) the result in the given example is eleven and a one is placed in storage. The borrow delete pulse, which is again produced because the sum of the two digits is ten or greater, prevents a borrow in the second significant digit position.

The fourth significant digit (three) of the offset number and the fourth significant digit (two) of the command number plus a one are added (during time interval m5) to produce a six in storage. However, since the sum of the offset and command digits is not ten or greater, a borrow delete pulse is not produced. In this example, the one added in the third digit position of the stored result is found to be invalid, and accordingly the borrow storage remains in the borrow state to reduce the stored result in the third digit position by one.

The fifth significant digit (one) of the offset number and the fifth significant digit (eight) of the command number and a one are added (during time interval m6) to produce a result of ten. In this instance a borrow delete signal is again produced and is transmitted to the borrow storage to place this borrow storage in a non-borrow condition and thus to prevent the borrowing of a one from the fourth digit position.

The least significant digit (nine) of the offset number and the least significant digit (one) of the command number are added (during time interval m7) to produce a ten. A zero is stored and a borrow delete pulse will be transmitted to the borrow storage. It will be noticed that a one is not arbitrarily added in the least significant digit position because a borrow one can never properly be taken therefrom.

The stored result (number 72.1600) in the above diagram is obviously not the correct sum of the offset and command numbers. The presence of a borrow delete pulse in the diagram indicates the validity of the number in the preceding column (corresponding to the next highest digit position). The absence of a borrow delete pulse in the position of the fourth highest significant digit position in the diagram indicates that the one was not validly included in the stored result in the third digit position and that the stored result in this digit position should be decreased by one. The modified result is then shown to be 72.0600 which is the correct result.

The necessity for reducing the result in the third highest digit position by one is indicated by the fact that the borrow storage did not receive a borrow delete signal during processing of the fourth highest significant digit and therefore remained in its borrow state.

It will now be understood that in the preferred arithmetic addition operation as diagrammed above, the assumption is initially made that a carry will exist to all digit positions (except the least significant digit position). Accordingly the sum of the digits in each digit position except the last one is initially increased by one. If the sum in any given digit position (this sum including the assumed carry from the preceding digit position) is not ten or greater, then a one must be removed from the result in the next higher digit position. The necessary adjustment may conveniently be made in the illustrated embodiment since the tentative results for the respective digit positions are placed in respective storage units which may be caused to count down by one upon receipt of a borrow signal from the borrow storage.

*Example of arithmetic subtraction by the system of FIGURE 1*

In the arithmetic control system described herein an offset number can have a command number arithmetically subtracted therefrom in a similar fashion, that is, by processing the numbers digit-by-digit from the highest significant digit to the least significant digit. In this instance the arithmetic control system is switched over from the addition mode to the subtraction mode. The subtraction of one number from another number in the arithmetic control system of this invention can be illustrated by reference to the following example.

| Time interval | (m2) | (m3) | (m4) | (m5) | (m6) | (m7) |
|---|---|---|---|---|---|---|
| Offset | 5 | 2 | 6 | 3 | 1 | 9 |
| Command | 3 | 2 | 7 | 4 | 2 | 1 |
| Stored result | 2 | 0 | 9 | 9 | 9 | 8 |
| Borrow pulse | | (1) | 1 | 1 | 1 | |
| Modified result | 1 | 9 | 8 | 8 | 9 | 8 |

The highest significant digit (five) of the offset number has subtracted therefrom the highest significant digit (three) of the command number (during time interval m2) in a straight forward count down manner to produce a two in the stored result.

During time interval m3, the second digit (two) of the offset number has subtracted therefrom the second significant digit (two) of the command number to produce a zero in the stored result.

The third digit (six) of the offset number has subtracted therefrom (during time interval m4) the third digit (seven) from the command number in a straightforward count down fashion. The count down will in this case pass through zero to nine. When the count down passes through zero a borrow pulse is produced. This borrow pulse will place the borrow storage in borrow condition to cause a borrow in the second digit position. When the borrow pulse is transmitted from the borrow storage to reduce the result (zero) stored with respect to the second digit position, the zero in the second digit position is changed to nine and this in turn causes a borrow pulse to be transmitted from the second digit position to the first digit position. The type of borrow pulse which occurs in this way is represented on the diagram by a number one in parentheses (1) in the second digit position.

The fourth digit (three) of the offset number has subtracted therefrom the fourth digit (four) of the command number (during time interval m5) to produce a nine in the stored result and to place the borrow storage in a borrow condition.

The fifth significant digit (one) of the offset number (during time interval m7) has subtracted therefrom the fifth significant digit (two) of the command number to produce a nine in the stored result and again placing the borrow storage in a borrow state.

The sixth and least significant digit (nine) of the offset number has subtracted therefrom the sixth and least significant digit (one) of the command number during time interval m7 to produce an eight in the stored result without placing the borrow storage in a borrow state.

It is obvious that the stored result of 20.9998 shown in the diagram is not the correct result and must be modified. The modified result (19.8898) obtained by the action of the borrow storage on respective next higher digit positions and by the sensing a zero to nine change in the second digit position is the correct result of the subtraction process. Referring to the subtraction diagram above, the system is such that the presence of a borrow pulse in a given digit position results in the borrowing or subtraction of a one from the stored result for the next higher digit position.

*Description of FIGURE 1*

*Mechanical command input mode.* — The arithmetic control system shown in FIGURE 1 is generally designated by reference numeral 10 and has an offset mechanical input 13 and a command mechanical input 14 connected thereto. The mechanical inputs 13 and 14 have associated therewith respective digit indicating devices 15–20 and 21–26. (The digit indicating devices 15 and 21 represent the 10 to the first power or "tens" digit position, the digit indicating devices 16 and 22 represent the ten to the zero power or units digit position, the digit indicating devices 17 and 23 represent the $10^{-1}$ digit position or tenths digit position, the digit indicating devices 18 and 24 represent the $10^{-2}$ or hundredths digit position, the digit indicating devices 19 and 25 represent the $10^{-3}$ or thousandths digit position and digit indicating devices 20 and 26 represent the $10^{-4}$ or ten thousandths digit position.)

A digit select module 29 (module E) has terminals thereof respectively connected to output lines 30–35 of the manual command input device 14, and also to output lines 36–41 of the manual offset input device 13. Lines 36–41 lead to command offset storage modules 44–49, respectively, each of which is provided by a G module. In this arrangement, the digit select module 29 (module E) can select the desired digit position to be processed in the arithmetic control system. In the preferred embodiment the tens digit position is processed, then the units digit position and so forth until the least significant digit position has been processed. An input line 52 into a terminal of the digit select module 29 (module E) will provide a digit shift signal which will remove the high state from the lines 35 and 41 when the tens digits of the mechanical offset and mechanical command inputs have been processed and the result placed into the first command offset storage module 49 (module G–I). The digit shift signal causes lines 34 and 40 to go high, allowing the digits stored in the mechanical digit devices 16 and 22 to be transferred into the mechanical decade decoder 53 (module D) which will then convert the decimal input information into a binary coded decimal number. After the second most significant digit has been processed in the system and placed into the second command offset storage module 48 (module G–II) the digit select module 29 (module E) will then shift the high state from lines 34 and 40 to lines 33 and 39, and so on until all the digits in the mechanical input devices 13 and 14 have been processed and placed into the command offset storage modules G–I through G–VI.

The sequence of operation during the addition or subtraction of one digit from the mechanical offset input 13 is controlled by the arithmetic control logic module 55 (module F). A start pulse from mechanical means (or from a tape reader) is required to start the sequence of operation. By way of example, a line 56 is shown connected to a tape input line 57 to provide the necessary start pulse to the arithmetic control logic 55 (module F).

*Tape command input mode.*—When an offset number in the mechanical offset device 13 is to be added to a command number from a tape reader or the like, the command offset number is first manually placed into the device 13 digit by digit in a decimal form whence it will be processed digit by digit when a start pulse is applied via lines 57 and 56 to the arithmetic control logic module 55 (module F). The first character from the tape can represent an axis select signal. The second character from the tape may represent the sign of the command pulse to indicate whether it should be added to or subtracted from the mechanical offset number. The third character from the tape may represent the highest significant digit of the tape command input number and will be combined with the highest significant digit of the mechanical offset input from manually adjusted device 13. The fourth through eighth characters from the tape represent digits in digit positions of successively lower significance of the command input number. When the complete block of information has been processed and the result has been placed in the command offset storage modules G–I through G–VI, the tape will advance to feed in a new block of information.

*Timing sequence for processing of one digit.*—When a start pulse 60, FIGURE 2, is applied to the input line 56 of the arithmetic control logic module 55 (module F), a multivibrator circuit therein will be triggered and after 10 microseconds a set pulse will appear on lines 61 and 62 to set an algebraic adder module 63 (module B) and a diminish command storage module 64 (module C), respectively. When the algebraic adder module 63 and the diminishing command storage module 64 have been set, the binary storage units therein are in a zero-registering condition and are in readiness to receive binary coded decimal digits from the mechanical offset input and tape input, respectively. Also, at the leading edge of the set pulse 59 (FIGURE 2) produced by start pulse 60 a block sign gate pulse 66, FIGURE 2, is applied to a line 69 leading to a terminal of the digit select module 29 (module E) so that the sign information from the tape which is applied to the E module via line 96 can be properly selected and applied to lines 67 and 68. Line 67 is the add line and is high when the command input number is to be added to the mechanical offset number, and line 68 is the subtract line and is high when the command input number is to be subtracted from the mechanical offset number.

At the end of the set pulse 59 a transfer pulse 70 is applied to lines 71 and 72 thereby allowing the binary coded decimal number which is stored in the mechanical decade decoder 53 (provided by module D) to be transferred in parallel fashion to the algebraic added module 63 (module B) while the digit information from the tape is transferred into the diminishing command storage module 64 (module C). For simplicity, the offset number which is processed by the arithmetic control system is referred to by the letter $z$ in some instances, while the command number, either from manual input or tape reader input, is referred to by letter $c$ in some instances. Five microseconds after the block sign gate pulse 66 has terminated an add one and start diminish pulse 74, FIGURE 2, is applied to line 75 to add a one count in the algebraic module 63 (module B) when the add line 67 is in the high state, and also to the line 76 to start the diminishing count down of the diminishing command storage module 64 (module C).

The count down of the diminishing command storage module 64 is accomplished by gating a pulse train 78 (FIGURE 2) from the mechanical decade decoder 53 (module D) through a line 79 to a terminal of module C and then out of the C module via line 80 to the algebraic adder 63 (module B). The train of pulses will continue to be applied to the algebraic adder 63 (module B) until such time that the diminishing command storage 64 (module C) has diminished its register to a zero-representing condition at which time a not-zero line 82 will go low, thereby stopping the pulse train 78. When the pulse train has been stopped, a diminish complete pulse 83 (FIGURE 2) will be applied to line 84 to indicate that the arithmetic control logic (module F) should continue with the sequence of operation. At this time, after the command digit in the diminishing command storage 64 (module C) has been added to the mechanical offset digit in the algebraic adder 63 (module B), the sum of the two digits is transferred into the command offset storage unit 49 (module G–I) through line 86 in response to a transfer pulse 87, FIGURE 2, which is applied to line 88. During the interval when transfer pulse 87 is present, a borrow trigger 90, FIGURE 2, may be applied via the line 91 to the algebraic adder 63 (module B). The trigger pulse may produce a borrow pulse from module B via a line 92 to the command offset storage units. The conditions under which such borrow pulse is transmitted have been described with respect to specific examples of addition and subtraction in a preceding section hereof.

At the end of the transfer pulse 87 a digit shift pulse 95 will be applied to the digit select module 29 (module E) through the line 52 to shift the operation to the next digit positions of the numbers to be added. When the least significant digits of the numbers to be added has been operated on and placed into the command offset storage unit 44 (module G–VI) a new block of information from the tape will be applied to the arithmetic control system and operated on in a similar manner.

If the command number is to be subtracted from the offset number the sequence of operation of the aritchmetic control logic 55 (module F) is the same as mentioned hereinabove for the addition process. However, minus sign information on the tape will result in no pulse being transmitted via tape input line 57 and line 96 to the digit select module 29 (module E). This, in conjunction with the block sign gate pulse such as 66 in FIGURE 2 applied to module E via line 69, will place the subtract line 68 in the high state and the add line 67 in the low state. The action in the algebraic adder 63 (module B) will then be one of counting down from the number stored therein instead of the action of counting up as during the addition process.

The pulse train 78 can originate from a suitable clock pulse generator and can be applied to the mechanical decade decoder 53 (module D) through a line 98. If the mechanical command input is to be added algebraically to the mechanical offset input, the binary coded decimal is applied to the diminishing command storage 64 (module C) through a line 99, and a line 100 then supplies a signal for shifting the diminishing command storage (module C) to a mechanical input mode.

A plurality of absolute position storage modules 105–110 (modules A–I through A–VI) are arranged to receive digital input information from the respective command offset storage modules G–I through G–VI via lines 115–120, respectively. The absolute position of the machine tool is fed into lines 125–130 and compared with the digital input information in the command offset storage G modules. By way of example, when the numerical value of the offset storage G modules is greater than the numerical value of the absolute position storage A modules a positive signal will be applied to the machine tool axis drive unit from a line 134 to move the machine tool in a given direction along the axis. However, if the numerical value of the offset command storage modules G–I through G–VI is less than that in the absolute position storage modules A–I through A–VI then a negative signal will be applied to the machine tool axis drive unit through line 134 to move the machine tool in the opposite direction along the axis.

*Detailed description of module A (FIGURE 3)*

A block diagram of the absolute position storage module 105 (module A–I) which is substantially the same as the other absolute position storage modules 106–110 is shown in FIGURE 3 and is designated generally by reference letter A. A plurality of input terminals A1–A8 are connected to flip-flop circuits A25–A28 through respective diodes A31–A38. The terminals A1–A8 are so arranged as to receive digital input information which will indicate the absolute position of the machine tool axis, from any suitable position indicating system. Direct read out information can be applied to output terminals A9–A16 from output lines A40–A47 and will indicate the instantaneous absolute position of the machine tool axis.

As the machine tool is moved along the axis toward its desired end point position, a series of pulses is applied to the first flip-flop circuit A25 from the terminal A18. As mentioned hereinabove, when the command offset stored number (in the G modules) is greater than the absolute position stored number (in the A modules) a positive control signal is applied to the machine tool axis drive control unit through line 134, FIGURE 1. This will also provide a high input state to the terminal A17 which is the add line of the absolute position storage A modules. In this condition, when serial input pulses are applied to the first flip-flop circuit A25 through the terminal A18, the flip-flop circuits A25–A28 will add these serial input pulses in a cumulative fashion. However, when the command offset number stored in the command offset storage (in the G modules) is less than the absolute position number stored in the absolute position storage (the A modules) terminal A19 is in the high state and the serial input pulses applied to flip-flop circuit A25 cause the flip-flops A25–A28 to count in a diminishing manner. A carry borrow pulse is also generated in the A module and applied to the terminal A20 each time the flip-flop circuits A25–A28 count up to ten or greater in the add state or count down to zero or less in the subtract state.

In a typical sequence of operation of the illustrated A module we will assume that the flip-flop circuits A25–A28 are in the reset state causing the reset lines A41, A43, A45, A47 to be in a high state and the set lines A40, A42, A44 and A46 to be in a low state to register a numerical value of zero. When input pulses applied to terminal A18 are to be counted in a cumulative manner the add line connected to terminal A17 is in the high state partially enabling AND gate circuits A50–A54 through lines A55–A59, respectively.

The first pulse of the serial input to terminal A18 will set the first flip-flop circuit A25 so that the line A40 will go high and the line A41 will go low, indicating a value of one at the terminal A9. When the flip-flop A25 was set, the reset line A41 went to the low state thereby triggering the negative input pulser A62. However, the positive output pulse from the negative input pulser A62 will not pass through the AND gate A63 since the subtract line connected to terminal A19 is in the low state.

The second serial input pulse from terminal A18 will reset the flip-flop circuit A25 causing the line A40 to go low and the line A41 to go high. The positive going pulse on line A41 will have no effect on the negative input pulser A62. The negative going pulse on line A40 will trigger the negative input pulser A65 and the positive output pulse therefrom will pass through the gate A50 (which is in an enabled condition) to set the second flip-flop circuit A26. This action will cause the line A42 to go high and the line A43 to go low indicating a stored value of two at the terminal A11.

The third serial input from terminal A18 will again set the flip-flop circuit A25 to cause the line A40 to go high and the line A41 to go low indicating a stored value of three at the terminals A9 and A11.

The fourth serial input pulse from terminal A18 will again set the flip-flop circuit A25. The negative going signal on line A40 will trigger the negative input pulser A65 and the positive output pulse therefrom will pass through the gate A50 to reset the flip-flop circuit A26. The negative going signal on line A42 will trigger the negative input pulser A66 and the positive output pulse therefrom will pass through the gate A51 to set the flip-flop circuit A27. This will cause the line A44 to go high and the line A45 to go low indicating a stored value of four at the terminal A13.

11

The fifth serial input pulse from the terminal A18 will set the flip-flop circuit A25 causing the line A40 to go high thereby indicating a stored value of five at terminals A9 and A13.

The sixth serial input pulse from the terminal A18 will reset flip-flop A25 causing the negative going signal on line A40 to pass through the negative input pulser A65 and therefrom through the gate A50 to set the flip-flop circuit A26. This action will cause line A42 to go high indicating a stored value of six at terminals A11 and A13.

The seventh input pulse from the terminal A18 will set the flip-flop circuit A25 indicating a stored value of seven at terminals A9, A11 and A13.

The eighth serial input pulse will set the flip-flop circuits A25–A27 in a sequential fashion as described hereinabove. The negative going signal on line A44 will then trigger the negative input pulser A68, and the negatve delayed edge of the pulse therefrom will trigger the negative input pulser A69, which will in turn set the flip-flop circuit A28.

Inverter circuits A70 and A71 will invert the output signals from the flip-flop circuit A28 and cause the line A47 to go high and the line A46 to go low to indicate a binary coded value of eight at terminal A15 and will cause the line A73 to go high thereby partially enabling the gate circuit A53. The negative going pulse on line A46, when flip-flop circuit A28 is set, will not pass from the negative input pulser A75 through the gate A76 because the subtract line connected to the terminal A19 is in the low state.

The ninth serial input pulse from the terminal A18 will set the flip-flop circuit A25 to register a binary coded decimal value of nine at the terminals A9 and A15.

The tenth serial input pulse from terminal A18 will then reset the flip-flop circuit A25 causing a positive pulse to be generated from the negative input pulser A65. This positive pulse will not cause through the gate circuit A50 since it is disabled by the negative going signal from the inverter circuit A70. However, the positive going pulse from the negative input pulser A65 will pass through the gate circuit A53 and therefrom through an AND gating circuit A78 and emitter follower circuit A79 to the terminal A20 to indicate a borrow signal to a corresponding A module of the next highest significant digit (except in the case of module 105). The negative going edge of the signal from the emitter follower A79 will trigger a multivibrator circuit A81 which in turn will produce a negative going signal to trigger the negative input pulser A82. The positive going pulse from the negative input pulser A82 will pass through the gate circuit A54 and through a line A83 to reset the flip-flop circuit A28. This action will again cause all the flip-flop circuits A25–A28 to be in the reset state thereby indicating a stored value of zero at the terminals A9–A17.

If a number is to be inserted into the absolute position storage A modules in a diminishing fashion the add line A17 will be placed in the low state and the subtract line A19 will be placed in the high state partially enabling gate circuits A63, A85, A86, A76 and A78. As in the addition procedure, the flip-flop circuits A25–A28 are in the reset state when a numerical value of zero is stored therein. The first input pulse from the terminal A18 will set the flip-flop circuit A25 causing the line A41 to go low and trigger the negative input pulser A62. Since the gate circuit A63 is partially enabled by the subtract line, the positive going pulse from the negative input pulser A62 will set the flip-flop circuit A26. The negative going signal on line A43 will pass through a negative input pulser A87 and therefrom through the gate circuit A85 to set the flip-flop circuit A27. This will cause the negative signal on line A45 to pass through a negative input pulser A89 and through the gate circuit A86 to set the flip-flop circuit A28. The negative going signal from the inverter circuit A70 will then trigger the negative input pulser A75 which will pass through the gate circuit A76 and the OR gate circuit 78 to trigger the multivibrator circuit A81 and produce a borrow signal at terminal A20. The negative edge of the square wave output from the multivibrator circuit A81 will then trigger the negative input pulser A82 and pass therefrom through the gate circuit A87 to reset the flip-flop circuits A26 and A27. The flip-flop circuits A25 and A28 are still in the set condition thereby indicating a binary coded value of nine at terminals A9 and A15.

The second serial input pulse from terminal A18 will then reset the flip-flop circuit A25 causing the line A40 to go low and decrease the binary coded number by one indicating a value of eight at terminal A15. The third serial input pulse from the terminal A18 will set the flip-flop circuit A25 causing the negative going signal on line A41 to pass through the negative input pulser A62 and therefrom through the gate circuit A63 to set the flip-flop circuit A26. In a similar fashion the negative going signal on line A46 will pass through the negative input pulser A87 and therefrom through the gate circuit A85 to set the flip-flop circuit A27. Since the flip-flop circuit A28 is already in the set condition, the signal received from the flip-flop circuit A27 will then reset the flip-flop circuit A28. This will cause the output signal from the inverter circuit A70 to go high which has no effect on the negative input pulser A75. The binary coded number seven is now indicated at terminals A9, A11 and A13.

The fourth and subsequent serial input signals from terminal A18 will continue in a similar fashion to decrease the binary coded number by one as long as the subtract line is in the high state. It should also be noticed that a borrow signal is generated during both the add and subtract operations each time the binary coded number passes through zero.

*Detailed description of module B (FIGURE 4)*

FIGURE 4 shows a block diagram of the algebraic adder circuit 63 which is designated generally by reference letter B. As mentioned previously the function of the algebraic adder module B is to algebraically combine successive corresponding digit positions of two numbers and the results are transferred respectively to offset storage modules G–I through G–VI. The set pulse 59, FIGURE 2, is applied to terminal B20 and therefrom through the emitter follower circuit B28 to lines B29–B32 to set the flip-flop circuits B35–B38. This condition will indicate a binary coded numerical value of zero at the output terminals B5–B12.

When the transfer pulse 70, FIGURE 2, is applied to the numerical decade decoder circuit 53 (module D) the binary coded number $z$ will be transferred to terminals B1–B4 and through the inverter circuits B41–B44 to flip-flop circuits B35–B38, respectively. This will set the flip-flop circuits B35–B38 to a binary coded decimal number corresponding to the first digit position of the ($m2$) decimal number inserted in the mechanical offset input device 13.

If the command signal from the diminishing command storage 64 (module C) is to be added to the number stored in the algebraic adder (module B) the add line B24 will be shifted to a high state and the subtract line B23 will be in the low state. Similarly, if the command number from the diminishing command storage (module C) is to be subtracted from the number stored in the algebraic adder (module B) the subtract line B23 will be shifted to a high state and the add line B24 will be in the low state. When the offset digit is to be transferred in parallel fashion into the algebraic adder module B the sign gates B60–B64 and B84–B88 will be clamped to ground by the block sign pulse 66, which is inverted to a negative signal and will be described herein below. A plurality of inverter circuits B46–B53 are arranged between the set and reset outputs of the flip-flop circuits B35–B38 to act as a buffer to the output terminals B5–B12.

The pulse train from the diminishing command storage 64 (module C) is applied to terminal B13 and therefrom will serially set and reset the flip-flop circuits B35–B38 in an ascending or descending fashion depending whether the add terminal B24 is high or the subtract terminal B23 is high. In the addition process, an arbitrary one is applied to the flip-flop circuit B35 through a gate circuit B56 having four input connections thereto. When the digit in process is the last (least significant) digit a non-add signal is received at terminal B19 and therefrom through an inverter circuit B57 to disable the add one gate circuit B56.

By way of example, when an offset digit of six is transferred from the D module to the B module an arbitrary one is added thereto. If a command digit of four is to be added to the offset number the sequence of events in the algebraic adder is as follows.

The add line from terminal B24 will be shifted to the high state thereby partially enabling gate circuits B60–B63 and setting the borrow flip-flop circuit B64. The flip-flop circuits B35–B37 will be in the set state and the outputs therefrom will be inverted causing the lines B67–B69 to go high and the lines B71–B73 to go low indicating a binary coded numerical value of seven at the output terminals B5, B7 and B9. The first pulse of the pulse train from terminal B13 will reset the flip-flop circuit B35, causing the reset signal therefrom to be inverted through inverter B50 to trigger the negative input pulser B77. The positive output pulse from the negative input pulser B77 will pass through the gate B60 to reset the flip-flop circuit B36 which also has its reset signal inverted and then applied to the flip-flop circuit B37 through a negative input pulser B79 and the gate circuit B61. The positive going reset pulse from the flip-flop circuit B37 is then inverted through inverter circuit B52 to trigger a negative input pulser B80 which in turn will trigger negative input pulser circuit B81, and the output pulse therefrom will pass through the gate circuit B62 to set the flip-flop circuit B38. The inverter circuits B49 and B53 will then invert the output signals from the flip-flop circuit B38 causing the line B70 to go high and the line B74 to go low to indicate a binary coded numerical value of eight at the output terminal B11.

The second pulse of the pulse train from terminal B13 will set the flip-flop circuit B35. The output signal from the inverter circuit B50 will then go high indicating a binary coded numerical value of nine at output terminals B5 and B11.

The third pulse of the pulse train 78, will reset the flip-flop circuit B35 causing the output from the inverter circuit B50 to go low and trigger the negative input pulser B77, and the positive pulse therefrom will not pass through the gate circuit B60 because it is disabled by inverter circuit B49. However, the positive pulse from the negative input pulser B77 (which may be termed a borrow delete pulse) will pass through the gate circuit B63 and therefrom to the borrow flip-flop circuit B64. This will reset the borrow flip-flop circuit B64 causing the set output thereof to go low and trigger a negative input pulser B82 to transmit a borrow pulse to terminal B22. This borrow pulse is blocked, however, at gate G50. At this time, the binary coded number indicated at the output terminals B5–B12 is zero.

The fourth pulse of the pulse train 78 will then set the flip-flop circuit B35 again causing the line B67 to go high from the inverter circuit B50.

It can be seen therefore that a binary coded number four has been added algebraically to a binary coded number seven and the resultant answer is a one in the algebraic adder and a borrow delete pulse to represent the number ten, for a total of eleven.

Also by way of example in the subtraction mode, if a binary coded digit of four of a command input number is to be subtracted from a binary coded digit of two of a zero offset input number the subtract line from terminal B23 is shifted to the high state thereby partially enabling the gate circuits B84–B88 and resetting the borrow flip-flop circuit B64. When the transfer signal 70, FIGURE 2, is applied to the mechanical decade decoder 53 (module D) the binary coded digit (two) of the offset number will be transferred in parallel fashion to the flip-flop circuits B35–B38 through terminals B1–B4 and inverter circuits B41–B44.

When a two is stored in the algebraic adder (module B) the flip-flop circuit B26 is in the set condition causing the line B28 to be in the high state and indicating a two at terminal B7. The first pulse of the pulse train from terminal B13 will set flip-flop circuit B35. The output signal is inverted through inverter circuit B46 to trigger a negative input pulser B90 which in turn will apply a signal through the gate circuit B84 to reset the flip-flop circuit B36. The negative set signal from flip-flop circuit B36 is then inverted through inverter circuit B47 to a positive signal which has no effect on a negative input pulser B91. The binary coded number of two at terminal B7 has been reduced to a binary coded number of one at terminal B5.

The second pulse of the pulse train from terminal B13 will reset the flip-flop circuit B35. The negative signal from the set output terminal is inverted to a positive signal which has no effect on the negative input pulser B90; however, the positive going reset signal from the flip-flop circuit B35 is inverted through inverter B50 to trigger the negative input pulser B77 and apply a positive pulse therefrom through a line B93 to the gate circuit B63. Since the flip-flop circuit B38 is in the reset state, the output of inverter circuit B53 is low thereby disabling the gate circuit B63 and not allowing the pulse applied thereto from the negative input pulser B77 to proceed. This will again reduce the binary coded number and indicate a zero value at the output terminals B–5 B12.

The third pulse of the pulse train from terminal B13 will set the flip-flop circuit B35, and the positive set signal therefrom will be inverted through inverter circuit B46 to trigger the negative input pulser B90. The positive pulse from pulser B90 will pass through the gate circuit B84 and set the flip-flop circuit B36. This will cause a negative output from the inverter circuit B47 to trigger the negative input pulser B91, and the positive output signal therefrom will pass through the gate circuit B85 to set the flip-flop circuit B37. The positive set signal from the flip-flop B37 is also inverted and applied to a negative input pulser B99 and therefrom through the gate circuit B86 to set the flip-flop circuit B38. A negative input pulser B104 is triggered by the inverted signal from the inverter circuit B49. The positive going signal from the negative input pulser B104 will pass through the gate B87 to set the borrow flip-flop circuit B64 and to pass through the OR gate circuit B96 to trigger the multivibrator circuit B97. No borrow signal will appear at terminal B22 from the negative input pulser B82 since the output of the borrow flip-flop circuit B64 is a positive signal, and as mentioned hereinabove, the negative input pulser requires a negative going signal to be activated. The negative going edge of the output signal from multivibrator B97 will trigger a negative input pulser B105 to transmit a pulse through the gate circuit B83 to reset flip-flop circuits B36 and B37. The binary circuits B35 and B38 will remain in the set condition and the lines B67 and B70 will be in the high state indicating a binary coded numerical value of nine at output terminals B5 and B11.

The fourth pulse from terminal B13 will reset the flip-flop circuit B35 and the output signals therefrom will have no further effect on the algebraic adder (module B). The flip-flop circuit B38 will then remain in the set condition indicating a binary coded numerical value of eight at terminal B11.

Detailed description of Module C (FIGURE 5)

FIGURE 5 is a block diagram of the diminishing command storage module 64 and is designated generally by reference letter C. A command signal can be inserted in the module C through the tape input line 57 (FIGURE 1) to terminals C9–C12, or from the mechanical command input through line 99 (FIGURE 1) to terminals C27–C30. If the command information is to be derived from tape, a tape enable signal is applied to terminal C15 and therefrom through an inverter circuit C35 to enable NOR circuits C36–C39. However, if the command input is to be stored in the diminishing command storage (module C) from manual information a manual enable signal is applied to terminal C31 and therefrom through an inverter circuit C42 to enable NOR circuits C44–C47.

Auxiliary function commands are applied to terminals C19–C26 from inverter circuits C50–C53 and emitter follower circuits C54–C57. The auxiliary function commands can come either from a tape input or from a manual input through OR gates C32, C33, C34 and C40. Additional auxiliary function command signals are applied to terminals C1–C8 from the output of inverter circuits C60–C67 through lines C70–C77, respectively.

When the set signal 59, FIGURE 2, is applied to terminal C16, flip-flop circuits C80–C83 will be placed in the set condition in readiness to receive command information. When the transfer signal 70, FIGURE 2, is applied to terminal C13 and therefrom through emitter follower circuit C85 the transfer circuits C87–C94 will be enabled allowing the tape or manual information to be stored in flip-flip circuits C80–C83.

The diminishing command storage (module C) will have the binary coded number stored therein decreased by one for each pulse of the pulse train 78, FIGURE 2, which is applied to a multivibrator circuit C97. The output of the multivibrator circuit C97 will also be applied to terminal C14 and therefrom to terminal B16 of the algebraic adder 63 (module B). The not-zero gate C99 has input lines C100–C103 connected thereto to disable the gate C99 when a value other than zero is stored in the diminishing command storage (module C). When the number stored in the diminishing command storage (module C) has been reduced to zero the output of the gate circuit C99 is applied to terminal C18 through an inverter circuit C106. This will interrupt application of pulses of the pulse train 78 to the multivibrator C97 and therefrom to the algebraic adder 63 (module B).

After a command number is received from the tape input terminals C9–C12 or from the manual input terminals C27–C30, the information will be converted into a pulse train corresponding to the numerical value of the command number and applied serially to the algebraic adder circuit 63 (module B). After the start diminish pulse has cycled, a command synchronizing circuit in the mechanical decade decoder module 53 (module D), the diminishing pulse train 78 will be applied to terminal C17 at a repetition rate of 100,000 cycles per second, for example. The pulse train, containing the desired number of pulses, will be automatically stopped by a synchronizing signal from the not-zero terminal C18 when the number in the flip-flop circuits C80–C83 is reduced to zero.

By way of example, if a binary coded number 4 were stored in the flip-flop circuits C80–C83 the flip-flop circuit C82 will be in the reset state causing the output of inverter circuit of C64 to go high, the output of inverter circuit C65 to go low. This will disable the gate circuit C99 and the negative signal therefrom will be inverted through inverter circuit C106 to provide a not-zero signal at terminal C18. The first pulse of the pulse train 78 from terminal C17 will trigger the multivibrator circuit C97, which has a two microsecond pulse duration, and the pulse therefrom will reset the flip-flop circuit C80. This pulse will also pass from the multivibrator circuit to terminal C14 and therefrom to terminal B13 of the algebraic adder module 63 (module B). The reset condition of flip-flop circuit C80 will cause the output of inverter C60 to go high and the output of inverter circuit C61 to go low to further disable the gate circuit C99 and to reset the flip-flop circuit C81. The reset condition of flip-flop circuit C81 will cause the output of inverter circuit C62 to go high and the output of inverter circuit C63 to go low thereby disabling gate circuit C99 through line 101 and setting the flip-flop circuit C82. The set output of flip-flop circuit C82 will not be used to reset the flip-flop circuit C83. It can be seen therefore that one pulse of the pulse train has passed through the multivibrator C97 and has proceeded to the algebraic adder module 63 (module B) and also has decreased the binary coded number in module C by 1.

The second pulse of the pulse train 78 will again trigger the multivibrator circuit C97 and apply a pulse therefrom to the terminal C14 while at the same time it will set the flip-flop circuit C80. As mentioned hereinabove, the set output of flip-flop circuit C80 will have no effect on the reset condition of flip-flop circuit C81. The binary coded number has again been reduced by 1.

The third pulse of the pulse train 78 passes through the multivibrator circuit C97 to terminal C14 and therefrom to the algebraic adder module 63 (module B) and will reset the flip-flop circuit C80. The reset output of the flip-flop circuit C80 will cause inverter circuit C60 to have a high output and the inverter circuit C61 to have a low output, thereby disabling the gate circuit C99 through line C100 and setting the flip-flop circuit C81. The binary coded number again has been reduced by 1.

The fourth pulse of the pulse train 78 will pass through the multivibrator circuit C97 to terminal C14 and therefrom to the algebraic adder module 63 and will set the flip-flop circuit C80. The set condition of flip-flop circuit C80 will cause the output of inverter circuit C60 to go low and the output of inverter circuit C61 to go high thereby enabling the gate C99 and applying a zero signal output from terminal C18 to the mechanical decade decoder module 53 (module D) to stop further application of pulses to the multivibrator C97.

Detailed description of Module D (FIGURES 6 and 7)

FIGURES 6 and 7 constitute a block diagram of the mechanical decade decoder and command synchronizing module 53 which is designated generally by reference letter D. The function of the part of module D shown in FIGURE 6 is to convert decimal numbers into binary coded numbers which can be processed by the arithmetic control system. The mechanical offset decimal number input device 13 has digit information therefrom applied to the terminals D9, D10, D11, D12, D13, D15, D16, D17, and D18, while the mechanical command decimal number input device 14 has digit information therefrom applied to terminals D19–D27. The transfer pulse 70, FIGURE 2, is applied to terminal D14 and therefrom through an inverter D37 and an emitter follower D38 to the input of OR gate circuits D40–D43. The absence of the transfer pulse 70, FIGURE 2, will maintain the output terminals D5–D8 in the high state because of the inverter circuit D37. When the transfer pulse 70 is applied to the terminal D14 the inverter circuit D37 will remove the positive signal from the OR gates D40–D43 and the decimal input information will be represented by negative output signals from terminals D5–D8 since the algebraic adder module 63 (module B) requires not-logic applied thereto. Output resistors D50–D53 are connected between ground and the output terminals D8–D5 of OR gates D40–D43, respectively.

The manual command input from terminals D19–D27 is applied to OR gate circuits D46–D49 and therefrom to output terminals D1–D4 in a binary coded form. As mentioned hereinabove, the mechanical command input is transferred to the diminishing command storage module 64 (module C) when the transfer pulse 70 is applied through line 72 to terminal D13.

When a decimal offset command number is applied to the mechanical decade decoder (module D) the decimal numbers are converted to binary coded decimal numbers in the following manner. A decimal number of one is applied to input terminal D9 and therefrom passes through the OR gate D40 to output terminal D8 to indicate a binary coded number of one. A decimal number of two is applied to input terminal D15 and therefrom through the OR gate D41 to output terminal D7 to indicate a binary coded number of two. A decimal number of three is applied to input terminal D10 and therefrom through OR gates D40 and D41 to output terminals D8 and D7, respectively, indicating a binary coded number of three. A decimal number of four is applied to input terminal D17 and therefrom through the OR gate D42 to output terminal D6 to indicate a binary coded number of four. A decimal number of five is applied to input terminal D11 and therefrom through OR gate circuits D40 and D42 to output terminals D8 and D6, respectively, indicating a binary coded number of five. A decimal number of six is applied to input terminal D16 and therefrom through OR gates D41 and D42 to output terminals D7 and D6, respectively. A decimal number of seven is applied to input terminal D12 and therefrom to OR gates D40, D41 and D42 to output terminals D8, D7 and D6, respectively. A decimal number of eight is supplied to input terminal D18 and therefrom through OR gate D43 to output terminal D5. A decimal number of nine is applied to input terminal D13 and therefrom through OR gates D40 and D43 to output terminals D8 and D5, respectively. In the case of a decimal number of zero no input signals are applied to the OR gates D40–D43.

The manual command input decimal number is converted to a binary coded decimal number from gate circuits D46–D49. A decimal number of one is applied to input terminal D19 and therefrom through OR gate D46 to output terminal D4. A decimal number of two is applied to input terminal D24 and therefrom through OR gate D47 to output terminal D3. A decimal number of three is applied to input terminal D20 and therefrom through gates D46 and D47 to output terminals D4 and D3, respectively. A decimal number of four is applied to input terminal D26 and therefrom through OR gate circuit D48 to output terminal D2. A decimal number of five is applied to input terminal D21 and therefrom through gates D46 and D48 to output terminals D4 and D2, respectively. A decimal number of six is applied to input terminal D25 and therefrom through gates D47 and D48 to output terminals D3 and D2, respectively. A decimal number of seven is applied to input terminal D22 and therefrom through gates D46, D47, and D48 to output terminals D4, D3, and D2, respectively. A decimal number of eight is applied to input terminal D27 and therefrom through gate D49 to output terminal D1. A decimal number of nine is applied to input terminal D23 and therefrom through gates D46 and D49 to output terminals D4 and D1, respectively. A decimal number of zero is represented when no input signals are applied to the OR gates D46–D49.

A block diagram of the command synchronizing circuit is shown in FIGURE 7 and designated generally by the reference letter D. Although the synchronizing command circuit is mounted or located on the D module there is no direct connection between the mechanical decade decoder circuit and the command synchronizing circuit.

An appropriate continuously operating pulse generator system is connected to terminal D29 to provide the necessary pulses of the pulse train 78. A pulse train having a desired number of pulses therein will be applied to the output terminal D28 when the gate D60 is automatically and synchronously enabled.

When the not-zero line D30 goes high, indicating that a binary number has been stored in the diminishing command offset module 64 (module C) the gate circuit D60 will be partially enabled and the inverter circuit D61 will have a low output. The start diminish pulse 74, FIGURE 2, is applied to terminal D31 and will set the flip-flop circuit D63 causing the reset output thereof to go low and partially enable the gate D65 through an inverter D66. After the gate circuit D65 has been set the first pulse from the pulse generating circuit (not shown) will trigger the multivibrator circuit D68 in synchronism with the pulse generating source. The pulse duration of the negative output pulse from the multivibrator D68 is three microseconds and the positive going edge of the output therefrom will reset the flip-flop circuit D63. The high reset output of flip-flop circuit D63 will set flip-flop circuit D70 and disable the gate circuit D65 through the inverter D66. The low state reset output of flip-flop circuit D70 is inverted to a high state by inverter D73 and applied to gates D60 and D71.

It can be seen therefore that the first incoming pulse from the pulse generating circuit and the start diminishing pulse 71 will enable the gate D60 and allow it to continuously pass pulses until the gate D60 is disabled. This will occur when the not-zero line D30 goes low, indicating that the number in the diminishing command offset storage 64 (module C) has decreased to 0. A low signal on line D30 will cause the output of the inverter D61 to go high partially enabling the gate D71 and resetting the flip-flop D70. Since the gate D71 is now enabled by inverter D61 and inverter D73, the next pulse applied to the gate D71 will reset flip-flop D70. The reset output from flip-flop D70 will then be inverted through D73 to disable gates D60 and D71, thereby stopping the pulse train applied to terminal D28 at a predetermined and synchronized time. The output of inverter circuit D73 not only disables the gates D60 and D71 but also triggers the multivibrator circuit D75 to produce the diminish complete pulse 83, FIGURE 2, at terminal D32.

*Detailed description of Module E (FIGURE 8)*

The block diagram of the digit select module 29 (module E) is shown in FIGURE 8 and is designated generally by reference letter E. The primary function of the digit select module E is to select functional information and digital information in a predetermined sequence, and thereafter channel the appropriate information to the required modules of the arithmetic control system 10. After a digit has been processed by the arithmetic control system the digit select module 29 (module E) will also select the appropriate command offset storage module corresponding to the digit selected.

The distribution of digit information is accomplished by enabling gates E41–E47 one at a time in a sequential manner. The output terminals E5–E11 will be placed in the high state when the appropriate gate circuit E41–E47 connected thereto is enabled. Gate E47 may be enabled and terminal E11 may be high during time interval $m1$ previously referred to. During this interval the desired sign information may be received from tape or a manual command device 310, FIGURE 19.

Gates E41–E46 when enabled will allow the appropriate digit from both the mechanical offset device 13 and the mechanical command device 14 to be propagated and algebraically combined before being placed into the associated command offset storage module. The highest significant digit is transmitted under the control of terminal E10 during time interval $m2$, the next highest significant digit is transmitted when terminal E9 is active, the third most significant digit is transmitted when terminal E8 is active, the fourth most significant digit is under the control of terminal E7, the fifth most significant digit is under the control of terminal E6, and the least significant digit is controlled by terminal E5 (during time interval $m7$).

In the illustrated embodiment it has been assumed that only six significant digit positions are to be processed. If a maximum of seven significant digit positions were to be processed, gate E40 would become the gate corresponding to the least significant digit position and would be connected accordingly.

When gate E40 is not used in the sequencing, terminal E4 may be connected to a suitable pulsing circuit 160, FIGURE 8, for generating a pulse such as indicated at 95 in FIGURE 2 when gate E40 is opened, the output of the pulser being connected (through suitable buffering OR gate circuitry or the like if required) to digit shift terminal E13. Only the positive going leading edge of the output from gate E40 should be able to trigger the pulsing circuit and not the negative going trailing edge which occurs when flip-flop E59 is reset.

The sign information is applied to terminal E15 for manual input and to terminal E16 for tape input. A sign select flip-flop E50, which will be in the reset condition for a minus sign input and in the set condition for a plus sign input, will partially enable gate circuit E51 or E52 through respective inverters E53 and E54. When the block sign gate pulse 66, FIGURE 2, is applied to terminal E2 and therefrom to the gate circuits E51 and E52, either the add terminal E1 or the subtract terminal E3 will be placed in the high state depending on the condition of the sign select flip-flop E50.

A director reset signal from terminal E14 will be applied to flip-flop circuits E57–E59 to insure that the gate E47 will be enabled, thereby placing the terminal E11 in the high state. This reset signal may be supplied to terminal E14 by manually operated reset means 161 indicated in FIGURE 8. After the sign information has been processed through the arithmetic control system a digit shift signal is received at terminal E13 and applied therefrom to the flip-flop circuit E57. This shift signal will place the flip-flop E57 in the set condition and the reset output therefrom will pass through inverter circuits E62 and E63 to place the line E75 in the low state, while the set output from flip-flop E57 will pass through the inverter circuits E60 and E61 to place the line E76 in the high state. This action will disable gate E47 and place the terminal E11 in the low state and enable the gate E46 to place the terminal E10 in the high state.

After the highest significant digit position has been processed in the algebraic adder module 63 (module B) another digit shift signal is received at the terminal E13 to reset flip-flop E57. This will cause the line E75 to go high and the line E76 to go low while at the same time the reset output will set the flip-flop E58. The reset output of flip-flop E58 will pass through inverters E66 and E67 to place the line E79 in the low state while the set output from flip-flop E58 will pass through inverters E64 and E65 to place the line E80 in the high state. This action will disable the gate E46 and place the terminal E10 in the low state, and enable the gate E45 and place the terminal E9 in the high state, thereby allowing the next most significant digit of the numerical input to be propagated through the arithmetic control system 10.

After the second most significant digit has been processed and placed into its respective command-offset storage module G–II a digit shift signal is applied to terminal E13 to again set the flip-flop E57. The reset output from flip-flop E57 will pass through inverters E62 and E63 to place the line E75 in the low state, and the set ouput of flip-flop E57 will pass through the inverters E60 and E61 to place the line E76 in the high state, which in turn will disable the gate E45 and enable the gate E44. The high state of terminal E8 will allow the third most significant digit to be propagated through the arithmetic control system and placed into the command-offset storage module G–III.

After the third most significant digit has been processed a digit shift signal is applied to terminal E13 to reset the flip-flop E57. The reset output of flip-flop E57 will cause the line E75 to go high and the line E76 to go low, and will also reset the flip-flop E78 causing the line E79 to go high and the line E80 to go low. The reset output of flip-flop E78 also sets the flip-flop E79, and the set output therefrom will pass through inverters E70 and E71 to place the line E85 in the high state. The reset output from flip-flop E59 will pass through inverters E68 and E69 to place the line E86 in the low state. This will cause the gate E44 to be disabled and the gate E43 to be enabled placing the line E7 in the high state and allowing the fourth most significant digit to be propagated through the arithmetic control system 10 and placed into the command-offset storage module G–IV.

After the fourth significant digit has been processed, another digit shift signal is received at terminal E13 to set the flip-flop E57, placing the line E75 in the low state and the line E76 in the high state. This action will disable the gate circuit E43 and enable the gate circuit E42 which in turn will place the terminal E6 in the high state. The high state of terminal E6 will allow the fifth most significant digit of the numerical input to be propagated through the arithmetic control system 10 and placed into the command-offset storage module G–V.

After the fifth significant digit has been processed, another digit shift signal is received at terminal E13 to reset the flip-flop E57 again shifting the lines E75 and E76 to the high state and to the low state, respectively. Also the reset output of the flip-flop E57 will set the flip-flop E58 which in turn will place the line E79 in the low state and the line E80 in the high state. This action will cause the gate circuit E42 to become disabled and the gate E41 to become enabled thereby placing the terminal E5 in the high state. The high state of terminal E5 will allow the sixth most significant digit of the numerical input to be propagated through the arithmetic control system 10 and placed into the command-offset storage module G–VI. In the illustrated embodiment it is assumed that this is the least significant digit.

After the sixth most significant digit has been processed, another digit shift signal will be received at terminal E13 to again set the flip-flop E57 placing the line E75 in the low state and the line E76 in the high state. This will cause the gate E41 to become disabled and the gate E40 to become enabled which in turn will place the terminal E4 in the high state. The positive going pulse thus generated at terminal E4 may be used to reset flip-flops E57 through E59 by the means indicated at 160 in FIGURE 8.

After the least significant digit has been processed and placed into storage a new block of information from the tape or manual input can be processed through the digit select module 29. Upon completion of processing of the least significant digit of the numerical input, the next block of information applied to the digit select module E will automatically reset the flip-flop circuits E57–E59 and flip-flop E50. However, if the next block of information applied to module E is to be processed with respect to the same axis a digit shift signal will again be applied to terminal E13 to reset the flip-flop E57, the flip-flop E57 in turn will reset the flip-flop E58 and the flip-flop E58 in turn will reset the flip-flop E59.

Each pair of outputs from the flip-flops E57–E59 is connected to a pair of cascaded inverters which will produce a cancelling effect of the inversion. The purpose of cascade inversion is primarily to isolate the flip-flops E57–E59 from the mechanical input digit information. The inverters E60, E62, E64, E66, E68 and E70, therefore are power inverters having a high output capacity.

The sign select flip-flop circuit E50 can also be set when the gate circuit E89 is enabled. The gate E89 is enabled when terminal E11 is in the high state, and when a not-axis word signal is applied to terminal E28, and when a transfer signal is applied to terminal E31. The sign select flip-flop E50 can be reset by a signal applied to the director reset terminal E17 or by a signal applied to the least significant digit transfer terminal E18. The signal from the least significant digit transfer terminal E18 is also applied to a negative input pulser E90 and therefrom to a multivibrator E91. The negative going ten microsecond pulse from the multivibrator E91 is inverted by inverter circuit E93 to partially enable the gate E94. The high state of terminal E11 is applied first to an inverter E95 and therefrom to an inverter E96 and an AND gate A97. The output of inverter E96 is applied to the gate E97 and when the output applied thereto is high at the same time that the output from the inverter E93 is high the gate E94 will be enabled.

When a buffer storage system (not shown) is used a new word from the buffer storage will be applied to terminal E19 and therefrom through the gate E97 to terminal E20, which in turn will apply the new word to the arithmetic control system. The new word from the buffer storage system (not shown) will also trigger the multivibrator E91 and the output therefrom will pass through inverter E93 and gate E94 to an emitter follower circuit E99 which produces the transfer signal to transfer the word in the buffer storage to active storage.

If an auxiliary function is desired, such as turning on a cooling source of introducing a lubricant at a certain position of the machine's operation, the block of information applied to the arithmetic control system 10 will not have an axis signal thereon. This will cause all the input terminals E23–E25 to go low and the output of a NOR gate E103 to go high partially enabling the NAND gate 105. The output of the NAND gate 105 will go low only when the NOR gate E103 connected thereto is in the high state and the terminal E26 is in the high state. The NAND gate E107 will produce a low state at terminal E30 only when the NOR gate E103 has a high output and the terminal E9, which in turn is applied to terminal E26, has a low output and terminal E10, which in turn is connected to terminal E29, has a low output.

*Detailed description of module F (FIGURE 9)*

A block diagram of the arithmetic control module 55 is shown in FIGURE 9 and is designated generally by reference letter F. The primary function of the arithmetic control module F is to produce control signals which will be applied to the arithmetic control system 10, in a sequential manner. The start pulse 60 shown in FIGURE 2 is applied to the terminal F20 to start a predetermined sequence of operation. The start pulse from terminal 20 will pass through an OR gate F35 and therefrom to an inverter F36 which in turn will trigger the multivibrator F37. The multivibrator circuits F37–F41 require a negative input pulse to be triggered. Therefore, the multivibrators F37–F41 can be triggered by the leading edge of a negative going signal or by the trailing edge of a positive signal.

The trailing edge of the ten microsecond pulse from the multivibrator F37 will trigger the multivibrator circuit F38 for a period of seven microseconds. A seven microsecond negative pulse is applied to an inverter circuit F50 and therefrom to gate circuits F51 and F52 and to a NOR gate F53. When a signal corresponding to a not sign pulse plus a not first most significant digit pulse plus an axis pulse is applied to terminal F15 it will enable the gate 51 thereby allowing the seven microsecond set pulse 59, FIGURE 2 to be applied to terminal F16. The signal on terminal F15 will also partially enable the gates F56 and F57 and disable the gate F58 through the inverter F59. When a not significant digit plus an axis signal is applied to terminal F17 it will partially enable the gate circuit F52, which is also partially enabled by inverter F62, thereby allowing the command set pulse to pass through an emitter follower F64 to terminal F18.

The leading edge of the negative output signal from a multivibrator F38 is also applied to the multivibrator F40. One of the outputs of multivibrator F40 is a negative pulse twenty-five microseconds in duration, which is applied to inverter F65 and therefrom to an OR gate F66 and to block sign gate terminal F30. This will produce the block sign gate pulse 66, FIGURE 2, which is applied to the digit select module 29 (module E).

The trailing edge of the positive output pulse from multivibrator F38 will trigger the multivibrator F39 at the same time the set pulse is removed from terminals F16 and F18. A fifteen microsecond negative pulse is then inverted through inverter F67 and will partially enable the gates F68, F66 and F69. The positive output from inverter F67 is also applied to an inverter F72 to disable the gate F57. The negative output from multivibrator F40 will be inverted by inverter F73 which in turn will apply a transfer pulse through an emitter follower circuit F74 to terminal F26, and also to emitter follower F75 through gate circuit F76 when the first most significant digit line F28 is high and when the not axis auxiliary function line F29 is high. The positive output from inverter F73 is also applied to the gate F68 which will enable the gate F68 thereby partially enabling the gates F56, F78, F79 and F80. The gate 78, which is enabled by the not significant digit plus axis pulse from terminal F17 and the fifteen microsecond pulse from the multivibrator F39 will place the command transfer line F13 in the high state, thereby transferring mechanical command information from the mechanical decade decoder module 53 (module D) to the diminishing command storage module 64 (module C). The gate 56, which is enabled by the not sign, not significant digit plus axis signal from terminal F15 and from the multivibrator F39 through inverter F67 and F68, will apply a z or offset transfer pulse to terminal F14, thereby allowing the mechanical offset information to be transferred from the mechanical decade decoder module 53 (module D) to the algebraic adder module 63 (module B).

After the transfer pulse 70, FIGURE 2, has terminated the multivibrator circuit F40 will still be producing the twenty-five microsecond pulse of the block sign gate signal. However, a few microseconds after the transfer pulse 70 has expired the block sign gate pulse 66 will terminate thereby triggering the multivibrator F41. The positive output from multivibrator F41 is five microseconds in duration and the trailing or negative going edge thereof will trigger the negative input pulser F82. The positive output pulse from the negative input pulser F82 will pass through the gate F57 when the inverter F72 connected thereto has an high output and when the not sign plus not significant digit plus axis terminal F15 is in the high state. The positive pulse at terminal F24 is represented by a waveform 74, FIGURE 2, and is used to arbitrarily add a 1 to each digit position except the least significant digit position when the arithmetic control system 10 is the add position and a start diminish pulse 74 is applied to terminal D31 of the mechanical decade decoder portion of module D shown in FIGURE 7.

After the add one and start diminish pulse 74 has been applied to terminal F24 the multivibrators F39–F41 will remain in the quiescent state until the diminishing command storage module 64 (module C) has completed its count down of the number stored therein. As mentioned hereinabove, a diminish complete pulse 83, FIGURE 2, will be generated by the multivibrator D75, FIGURE 7, and applied to terminal F31 to trigger the multivibrators F39 and F41. The output of multivibrator F39, which is negative, is inverted by inverter F67 and applied to the gate F66. The output of gate F66 passes through a NOR gate 93 and is inverted by an inverter F94 to place the terminal F22 in the high state. This high state represents the offset plus or minus command transfer pulse 87, FIGURE 2, which will transfer the combined algebraic sum of the mechanical offset input and the command input into the command offset storage modules G–I through G–VI. The high state of terminal F22 is also fed back through a line F95 to partially enable a gate F96, which is also connected to the least significant digit terminal F8. When the transfer pulse 87 is applied to terminal F22 during the processing of the least significant digit the gate F96 will be enabled thereby resetting a flip-flop circuit F98 which is the tape mode of operation. The flip-flop circuit F98 can be set, or placed in the manual mode of operation, by input signals from the manual start terminal F9 or from the manual new word terminal F10. The outputs of flip-flop F98, when in the reset condition, will pass through inverters F100 and F101 thereby placing the line F102 in the low state and the line F103 in the high state. The high state of line F103 will then be applied to terminal F1 to enable the tape input to the arithmetic control system 10. The high state of line 103 is also applied to gate F80 and will pass therethrough to the tape sign terminal F2 when the gate F80 is enabled.

When the flip-flop F98 is in the set or manual mode of operation the output line F102 is in the high state. The manual sign terminal F5, connected to the gate F79, will be in the high state when the gate F79 is enabled. The line F102 is also connected to gates F107 and F108. When the gate F107 is enabled the high state of line F102 will then place the manual enable terminal F11 in the high state thereby not allowing tape information to be applied to the arithmetic control system 10.

As mentioned hereinabove, the diminish complete pulse 83 was also applied to multivibrator F41, and the negative or trailing edge of the positive output therefrom will trigger the negative input pulser F82 thereby applying a borrow pulse to terminal F25 through the gate F69. The borrow trigger 90, FIGURE 2, will occur only when the gate F69 is enabled both by the output of multivibrator F39 and the multivibrator F41.

The trailing edge of transfer pulse 87 triggers the negative input pulser F110 and the output therefrom places the cycle complete and digit shift terminal F23 in the high state allowing the next digit to be operated on. The output of negative pulser F110 is also applied to gate F108 thereby enabling the gate F108 during the manual mode of operation. The gate F108 provides the recycling feature required for manual input information. Therefore, once a numerical value has been inserted into the mechanical input only the first start pulse from the manual start terminal F9 is required to start the sequence on the first most significant digit. After the first digit has been processed the output of the negative input pulser F110 will not only shift the mode of operation to the next digit but will also apply a recycling pulse through gate F108 to the OR gate F35 and therefrom to the multivibrator F37. As mentioned hereinabove, when the multivibrator F37 is triggered initially, the sequence of operation thereafter is automatically controlled by the multivibrators F38, F39, F40 and F41.

*Detailed description of module G (FIGURE 10)*

The command offset storage module G–I, which is substantially the same as the other command offset storage modules G–II through G–VI, is shown in FIGURE 10 and is designated generally by a reference letter G. The function of each command offset storage module G is to provide a place to store the associated command offset digit and also to provide means to compare the stored offset digit with other storage information corresponding to the absolute position of the machine tool. The command offset storage module G will also provide sign information to move the machine tool in the appropriate direction to minimize the algebraic difference between the number in the command offset storage G modules and the number in the absolute position A modules. As mentioned hereinabove, when the numerical value in the offset storage G modules is greater than the numerical value in the absolute position storage A modules a positive signal will be applied to the machine tool axis control from a line 134 to move the machine tool in a given direction. However, if the numerical value in the offset storage G modules is less than that in the absolute position storage A modules a negative signal will be applied to the machine tool axis control through the line 134 thereby moving the machine tool in an opposite direction.

When the word address terminal G6 is high and the digit select terminal G7 is high AND gate G35 is enabled, thereby partially enabling the AND gate G36. Only that digit offset storage module G–I through G–VI which corresponds to the appropriate digit input will be enabled by the digit select terminal G7. The high output of an AND gate G35 is also applied to a line G39 and therefrom to terminal G4 through a diode G40. The high state of terminal G4 enables the corresponding mechanical digit offset to be operated in combination with the tape command digit simultaneously. It should also be noted that the high state of line G39 will cause the output of the inverter circuit G42 to be in the low state.

When the offset plus or minus command or command offset transfer pulse 87 is applied to terminal G8 the gate G36 will transmit the pulse to enable an emitter follower G43, thereby enabling the transfer circuits G45–G48. The pulse transmitted by gate G36 is also applied to a gate G50 which is enabled by the borrow pulse 90, FIGURE 2, and the output therefrom will be applied via OR gate 52 and terminal G11 to a similar G module of the next higher significant digit.

During the time that the transfer circuits G45–G48 are enabled the input terminals G1, G2, G3 and G5 will apply a binary coded digit to the flip-flops G55–G58 in a parallel fashion. The binary coded numbers stored in the flip-flops G55–G58 can be modified by a one from the borrow input terminal G10 which will receive a borrow pulse from a similar G module of the next lowest significant digit.

During the time interval of the transfer pulse 87, FIGURE 2, the output of inverter G42 will be low thereby disabling the gate G60. However, when the transfer pulse 87 has terminated the gate G60 will be partially enabled and will produce an output pulse when the flip-flops G55–G58 pass a numerical count of ten, thereby triggering the negative input pulser G62. The positive output of the negative input pulser G62 is applied to the OR gate G52 through the gate G60 thereby causing the terminal G11 to go high. The high output of terminal G11 will then be applied to a similar G module to input terminal G10 as mentioned hereinabove.

By way of example, if a zero is transferred from the algebraic adder module 63 (module B) in parallel fashion through terminals G1, G2, G3, and G5 the flip-flops G55–G58 will remain in the set condition. When a borrow pulse from a similar G module of the next lowest significant digit is applied to terminal G10 the flip-flop G55 will be set. The output of flip-flop G55 will go high, which in turn will set the flip-flop G56 and the output therefrom will set the flip-flop G57. The high output of flip-flop G57 in turn will set the flip-flop G58. However, the reset output of flip-flop G58 is low when the flip-flop G58 is in the set condition thereby applying a negative pulse to the negative input pulser G62. The positive output pulse from the negative input pulser G62 will pass through the gate G60 and therefrom to the output terminal G11 through the OR gate G52. This output pulse represents a borrow signal and is applied to a similar G module of the next highest significant digit to the input terminal G10.

It can be seen therefore that the flip-flops G55–G58 while in the set condition represent a binary coded number of 15 and must be modified to represent a binary coded number of 9.

When the net most significant digit is being processed by the arithmetic control system 10 a set pulse will be applied to the offset storage modules G–I through G–VI but only that module which is selected by the digit select module 29 (module E) will be placed in the set condition when AND gate G51 is enabled. Therefore, the set and modified terminal G12 will apply a signal through an AND gate G65 when that module does not correspond to the significant digit being operated on. Since the output of the inverter G42 is high partially enabling the gate G65 and since the output of an emitter follower G67 is high also partially enabling the gate G65, the set pulse applied to the terminal G12 will propagate through the gate G65 and reset the flip-flops G56 and G57. As previously mentioned, the binary coded number stored in the flip-flops G55–G58 is 15, therefore, by resetting the flip-flops G56 and G57 the binary coded number of 15 is reduced to a binary coded number of 9 which is the modified and correct value to be stored in the offset command storage module G.

The outputs of the flip-flops G55–G58 are applied to output terminals G13–G16 from emitter followers G70–G67, respectively. This binary coded information can be applied to a suitable direct readout device (now shown) to indicate the desired end point the machine tool must move towards.

The compare function of the G module is accomplished by the operation of NOR gates G75–G82. The output of the binary coded offset digit in flip-flops G55–G58 is applied to NOR gates G79–G82 through lines G90–G93, respectively. The set output of the flip-flops G55–G58 is applied to the NOR gates G75–G78 through lines G95–G98, respectively. The binary coded digit information from the A module, which is to be compared with the binary coded information stored in the G module, is applied to terminals G24–G32 and therefrom to the gates G75–G82 as shown in FIGURE 10.

Since the output of the NOR gates G75–G82 will go low when one or more input signals is applied thereto a pair of OR gates G85 and G86 will be partially disabled. The NOR gates G75 and G79 work together with the flip-flop G55 and the flip-flop A25, FIGURE 3, respectively. The NOR gates G76 and G80 work together with the flip-flop G56 and flip-flop A26, FIGURE 3, respectively. The NOR gates G77 and G81 work together with the flip-flop G57 and flip-flop A27, FIGURE 3, respectively. The NOR gates G78 and G82 work together with the flip-flop G58 and the flip-flop A28, FIGURE 3, respectively.

The operation of the paired NOR gates G75–G80 while comparing the binary coded number of the flip-flops G55–G58 with the binary coded number in the flip-flops A25–A28, FIGURE 3, has four possible alternatives.

The first alternative is that the flip-flop G55 is in the set condition, thereby causing the line G95 to be high and the line G90 to be low, which in turn will cause a low output from NOR gate G75. Also at this time, the flip-flop A25, FIGURE 3, is in the set condition causing the terminal G25 to go high and the terminal G26 to go low providing a low output from NOR gate G79. Since the outputs of both NOR gates G75 and G79 are low, indicating no difference between the binary value of flip-flop G55 and the binary value of flip-flop A25, the OR gates G85 and G86 will not be enabled by NOR gates G75 and G79, respectively.

The second possible operation of the comparator NOR gates G75 and G79 is when the flip-flop G55 is in the reset condition and the flip-flop A25 is in the reset condition. When flip-flop G55 is in the reset state the line G95 will be low and the line G90 will be high thereby causing the NOR gate G79 to have a low output. When the flip-flop A25 is in the reset state the line A41 will be high and line A40 will be low, and the signals therefrom will be applied to terminals G25 and G26 causing the output of NOR gate G75 to go low. When the outputs of both the NOR gates G75 and G79 are low, the OR gates G85 and G86 will be disabled, thereby indicating no difference between the binary coded number in flip-flop G55 and the binary coded number in flip-flop A25.

The third possible alternative condition which may occur in comparing the binary coded numbers in flip-flop G55 and the binary coded number in flip-flop A25 is when the flip-flop G25 is in the reset state and the flip-flop A25 is in the set state. The reset output of flip-flop G55 will cause the line G90 to go high and the line G95 to go low thereby causing the output of NOR gate G79 to be low and output of NOR gate G75 to be high. The set output from flip-flop A25 will cause the line A40 to be high and the line A41 to be low, and the signal therefrom will be applied through terminals G25 and G26,, respectively, which will further cause the NOR gate G79 to go low and the NOR gate G75 to go high. The difference in output potential of the NOR gates G75 and G79, which indicates a difference between the binary coded numbers in the flip-flop G55 and the flip-flop A25, will be applied to OR gates G85 and G86. Since the output of NOR gate G79 is low the OR gate G86 will remain inoperative. However, the high output from NOR gate G75 will pass through the OR gate G85 and therefrom through a resistor G100, an emitter follower circuit G101, the line G102 and the OR gate G105, thereby applying a negative signal at terminal G17. This negative signal from G17 can be applied to suitable motor or actuation means through a line 134, FIGURE 1, to move a machine tool in the desired direction to eliminate the difference between the flip-flop G55 and the flip-flop A25.

The fourth possible alternative of operation from flip-flops G55 and A25 is when the flip-flop G55 is in the set condition and the flip-flop A25 is in the reset condition. The set output of the flip-flop G55 will cause the line G95 to go high and the line G90 to go low thereby enabling the NOR gate G75 causing a low output therefrom. The reset output from the flip-flop A25 will cause the line A41 to go high and the line A40 to go low, and the signals therefrom will be applied to terminals G25 and G26 which will further enable the gate G75 causing the output therefrom to go low. Both the low outputs from the line G90 and the line A40 are applied to NOR gate G79, causing the output therefrom to remain high. This difference of output potential from NOR gates G75 and G79 indicates a difference in the binary coded numbers registered in flip-flop G55 and flip-flop A25. The low output from NOR gate G75 is applied to OR gate G85 and has no effect thereon. However, the high output of NOR gate G79 will enable the OR gate G86 and the high output therefrom will pass through resistor G107, emitter follower G108, line G109 and OR gate G110, thereby placing a positive signal at terminal G23. The positive signal on terminal G23 can then be applied to the line 134, FIGURE 1, and therefrom to suitable motor or other actuating means to move the machine tool in the desired direction to eliminate the difference between the flip-flops G55 and A25.

The operation of the remaining pairs of NOR gates G76 and G80, G79 and G81, and G78 and G82 is similar to that of the NOR gates G75 and G79. However, the output of NOR gates G76, G77, G78, G80, G81, and G82 is not only applied to OR gates G85 and G86 but is also applied to the preceding NOR gates. The output of NOR gate G76 is applied to the OR gate G85 and to NOR gate G79. The output of NOR gate G80 is applied to OR gate G86 and also to the NOR gate G75. The output of NOR gate G77 is applied to OR gate G85 and to NOR gates G79 and G80. The output of NOR gate G81 is applied to a gate G76 and to NOR gates G75 and G76. The output of NOR gate G78 is applied to an emitter follower G113 and therefrom to the OR gate G75 and to the NOR gates G79, G78 and G81. The output of NOR gate G82 is applied to an emitter follower G114 and therefrom to the gate G76 and to the NOR gates G75, G78 and G77.

The operation of the NOR gates G75–G82 when a binary coded digit from flip-flop G55–G58 and a binary coded digit from flip-flops A25–A28 is applied thereto is explained hereinbelow. By way of example, if a binary coded digit of 8 in the flip-flops G55–G58 is to be compared with a binary coded digit of 7 in the flip-flops A25–A28 the flip-flop G58 will be reset and the flip-flops A25–A27 will be set. The reset output of flip-flop G58, which will cause the line G98 to go low and the line G93 to go high, is applied to NOR gates G78 and G82. The low output of line G98 will have no effect on the NOR G78; therefore, the high output therefrom will enable the gates G97, G80 and G81. The high output from line G93 will enable the gate G82 and the low output therefrom will have no effect on the NOR gates G75, G76 and G77. It can be seen therefore than the output of flip-flop G58 will cause the output of NOR gate G75 to go high and the output of NOR gate G79 to go low.

The binary coded digit of 7 in the absolute position storage module A (FIGURE 3) will cause the lines A40, A42 and A44 to go high, and the signals therefrom will pass from terminals A9, A11 and A13 to terminals G25, G27 and G29 thereby further enabling the NOR gates G79, G80 and G81. The low state of lines A41, A43 and A45 from the set outputs of flip-flops A25, A26 and A27 is applied to terminals A10, A12 and A14 and therefrom to terminals G26, G28 and G30 to further disable the gates G75, G76 and G77.

As mentioned hereinabove, the high output of NOR gates G75–G78 will pass through the OR gate G85 and therefrom through the resistor G100, emitter follower circuit G101, line G102 and OR gate G105 to place the terminal G17 in high state. The high state of terminal G17 will energize or actuate an appropriate device to move the machine tool in the desired direction.

The gate circuits G105 and G110 also have input terminals G18 and G22 connected thereto. The input signals applied to terminals G18 and G22 are received from similar G modules of higher significant digit value at their terminals G17 and G23. In this manner, the sign information pertaining to the difference of offset information and absolute position information of the highest significant digit is applied to the input terminals G18 and G22 of the G module of the next lowest significant digit. Similarly the output from the next lowest significant digit G module will be applied to the inputs of the next lowest significant digit, and each output of sign information from a preceding G module is applied to the input to the next lowest significant digit G module until the output of the least significant digit is applied to the machine tool in a controllable manner to eliminate the difference as mentioned hereinabove.

The gate circuit G112 will be enabled when either the line G102 or the line G109 is high. The output from the gate G112 will be applied to terminal G24. This high output is then applied to an input terminal G19 of the next lower digit G module causing the output of the OR gate G115 to go low and the output of inverter G116 to go high. The output of inverter G116 is then applied through a pair of diodes G117 and G118 and therefrom through the gate G112 to a pair of emitter follower circuits G101 and G108. The output of gate G112 in each G module is applied to the input terminal G119 of the next digit G module and continuously in that manner until the output of the least significant digit is converted to an analog value proportional to the machine tool position.

Inverter circuit (FIGURE 11)

The cascade inverters shown in FIGURE 11 serve to isolate the output of one circuit from the input of another circuit when there is a distinct difference between their power requirements.

In FIGURE 11 the two transistor circuits are shown as two circles 201 and 202 having input lead 204 and output lead 205 and a direct coupling lead 206 connected therebetween.

The transistors 208 and 209 are employed as common emitter amplifiers and provide signal inversion of signals applied thereto. The cascade inverters 201 and 202 are used only in module E and are designated E60, E61, E62, E63, E64, E65, E66, E67, E68, E69, and E70, E71. The output of transistor 209 is used when a control signal is to be applied to a low impedance circuit. However, when signal inversion is required for higher impedance circuits, the output of transistor 208 is taken directly from the collector electrode thereof and applied to the output lead 206 and therefrom to the desired circuit, and this is the preferred circuitry used in all the other inverters of the illustrated system.

NAND circuit (FIGURE 12)

The NAND circuit shown in FIGURE 12 will provide a negative signal at the output lead 220 when both input terminals 221 and 222 have positive signals simultaneously applied thereto. The NAND circuit shown in FIGURE 12 is used in all NANDS except E107.

Negative input pulser (FIGURE 13)

The one transistor NIP circuit 225 shown in FIGURE 13, will provide positive pulses at the output lead 226 when a negative signal is applied to the input lead 227. A negative signal applied to the NIP circuit 225 is applied to a series circuit including diode 228 and resistor 229 to develop the signal which is applied to the base of the transistor 230 through the capacitor 231. The NIP circuit 225 is used as NIPs A62, A66, A87, A89, B90, and B105.

Negative input pulser (FIGURE 14)

The one transistor NIP circuit 235, shown in FIGURE 14, operates in a similar fashion to the NIP circuit 225 in FIGURE 13; however, the negative signal at input lead 237 is applied directly through a capacitor 240 to the base of a transistor 241. The NIP circuit 235 is used in all other NIP circuits not mentioned above with respect to FIGURE 13.

NOR circuit (FIGURE 15)

The NOR gate shown in FIGURE 15 has a positive potential at the output lead 245 when no signal is applied to the input leads 246 and 247. When a positive signal is applied to either or both of the leads 246 and 247 the transistor 250 will be biased in the conductive state causing a negative output signal through the lead 245. The NOR gate circuit 245 is used in the NORs designated G75 through G82.

NOR circuit (FIGURE 16)

The NOR gate shown in FIGURE 16 has a positive potential at the output lead 255 when no signal is applied to the input leads 256 and 257. When a positive signal is applied to either or both of the leads 256 and 257 the transistor 260 will be biased in the conductive state causing a negative output signal through the lead 255. The NOR gate circuit 255 is used as all other NORs in the arithmetic control system shown in the drawings.

Multivibrator circuit (FIGURE 17)

In the multivibrator circuit 264 shown in FIGURE 17 a pair of transistors 265 and 266 connected in circuit as shown in FIGURE 17, are quiescent when transistor 265 is conductive and transistor 266 is non-conductive. In the quiescent state, the output lead 268 has a positive potential applied thereto and the output lead 269 has a negative or near ground potential applied thereto. The input lead 272 requires a negative going signal to bias the transistor 265 in the non-conductive state which in turn will commutate the transistor 266 in the conductive state. This will cause a positive square wave pulse at output lead 269 and a negative square wave pulse at output lead 268. Since most circuits require positive going signals to activate them the positive going trailing edge of the negative square wave may be considered a delayed trigger. The value of all components is shown in FIGURE 17; however, the value of capacitor 274 is changed to produce an output pulse of a desired duration. A list of different values of capacitors is shown in the following table indicating the output pulse duration obtained from different values of capacitance.

MULTIVIBRATOR CONFIGURATION

| Used as | Values of Capacitor 274 (µµf) | Time Duration of Output (microseconds) |
|---|---|---|
| A81 | 345 | 5 |
| B97 | 345 | 5 |
| C97 | 100 | 2 |
| D68 | 200 | 3 |
| D75 | 2300 | 30 |
| E91 | 680 | 10 |
| F37 | 680 | 10 |
| F38 | 500 | 7 |
| F39 | 1070 | 15 |
| F40 | 1900 | 25 |
| F41 | 345 | 5 |

NAND circuit (FIGURE 18)

The NAND circuit shown in FIGURE 18 will provide a negative signal at output lead 275 when positive signals are applied to input lead 276 and to either or both input leads 277 and 278 simultaneously. The NAND circuit shown in FIGURE 18 is used as NAND gate E107.

Detailed description of mechanical input switches (FIGURE 19)

The respective digit positions $m2-m7$ of the offset number have cooperable therewith rotary switch devices 15–26 and each has nine selective closed positions and an open position (representing a decimal zero). The movable contact of each switching device 15–20 is used to select the desired decimal number, one through nine, and upon application of a digit select transfer signal from the corresponding G module the decimal number of the given digit position will be transferred into the D module where the number is converted into a binary coded decimal.

The respective digit positions $m2-m7$ of the command number have cooperable therewith rotary switch devices 21–26 and each has nine selective closed positions and an open position representing a decimal zero. The movable contact of each switching device 21–26 is used to select the desired decimal number, one through nine, and upon application of a digit select signal from the digit select module E the desired digit position will be enabled through the associated diode 301–306, thereby transferring the desired number into the D module where it is converted into a binary coded decimal.

The manual sign input information is obtained from the alternative selective positions of a switching device 310 and the selected condition is applied to the gate F79 through the line 312.

In FIGURE 19, a manually actuated switch 400 has been indicated diagrammatically as a means for manually inserting a manual start command. When the switch 400 is placed in the right hand or manual start position, a ground line 401 is removed from OR gate 402, allowing the output of the gate 402 to go high. The positive going edge of this gate output signal triggers monostable multivibrator 404. The trailing edge of the output signal from multivibrator 404 may trigger negative input pulser 406 to supply a positive pulse via line 407 to terminal F9 of the F module.

The pulse supplied to terminal F9 may set flip-flop F98 to establish the manual mode of operation.

The pulse supplied to terminal F9 from the manual start switch 400 may also be transmitted through OR gate F35 to trigger the multivibrator F37 and initiate a cycle of operation as diagrammed in FIGURE 2. Since at this time the not zero line connected to terminal D30 will be low (indicating a zero stored in module C), the circuitry of FIGURE 7 will supply a diminish complete signal at D32. This signal will be transmitted to terminal F31. Among other functions, the signal supplied to terminal F31 will trigger monostable multivibrator F39 to produce a positive pulse at the output of inverter F67 which is transmitted through gate F66, and delivered to NOR circuit F93. The negative pulse at the output of NOR circuit F93 is inverted by inverter F94. The output of inverter F94 at its negative going trailing edge triggers negative input pulser F110 to generate a digit shift pulse such as indicated at 95 in FIGURE 2 at terminal F23. Terminal F23 is connected to terminal E13, so that the digit shift pulse will set flip-flop E57 and place the E10 terminal in a high state to begin time interval $m2$.

For purposes of diagrammatic illustration in FIGURE 19, gate 402 has also been indicated as having its output connected to terminal G6 of each of the modules G–I through G–VI (through a pair of inverters 410 and 411 if necessary) via a line 412.

After the terminal G6 of module G–I, FIGURE 10 is in a high condition, the setting of flip-flop E57 will cause the output from gate E46 to go high as previously mentioned. The signal from the output of gate E46 is transmitted from terminal E10 to terminal G7 and will pass through gate G35 because of the enabling thereof by the high condition of line 412, FIGURE 19, which is connected to terminal G6.

The high output from gate G35 will be applied to terminal G4 via diode G40 to enable selector switch 15, FIGURE 19, of the zero offset input device 13.

In the manual mode with flip-flop F98 set, AND gate F108 is enabled via line F102. Accordingly the digit shift pulse from negative input pulser F110 which was previously referred to as being supplied to terminal F23 is also transmitted by AND gate F108 and OR gate F35 to initiate a further digit cycle (after the ten microsecond delay introduced by monostable multivibrator F37).

Succeeding digit cycles may occur automatically until at the processing of the least significant digit position, terminals B19 and F8 to high by virtue of their connection to terminal E5 to disable gate B56 via inverter B57 (to prevent the adding of a one during the addition operation) and to enable gate F96 so that the transfer pulse at the end of time interval $m7$ will reset flip-flop F98 to the tape mode. With flip-flop F98 reset, gate F108 is closed, and the digit shift signal from negative input pulser F110 cannot initiate a further cycle in the manual mode.

It should be understood that for the purposes of a simplified one axis control system it may be assumed that the various gates controlled by axis words, auxiliary function conditions and the like are manually placed in open condition where required for the present description or simply replaced by OR gates where only two inputs are involved. Similarly for the one axis system, it may be assumed that manual switches are provided for resetting the circuitry to the required initial condition where the automatic circuitry for this purpose has not been disclosed. The parts not referred to herein either are unnecessary to an understanding of the single axis control system specifically described, or have functions which will be obvious to those skilled in the art from a consideration of the drawings and of intended operation as disclosed in the specification.

It will be apparent that many modifications and variations may be effected without departing from the scope of the novel concepts of the present invention.

I claim as my invention:

1. In a numerical control system,
   means for receiving a command input number having a plurality of digit positions and for receiving a zero offset input number having a plurality of digit positions,
   arithmetic processing means for selectively adding the command input number to the zero offset input number as one alternative and selectively substracting said command input number from said zero offset number as a second alternative, and in both of said alternatives processing said input numbers digit by digit beginning with the most significant digit positions of said numbers and storing the resultant number, means for receiving sign information concerning said command input number and controlling said arithmetic processing means to carry out an addition operation of said input numbers in response to positive sign information and to carry out a subtraction operation in response to negative sign information, means for receiving a position feedback number in accordance with the position of an output, and means for comparing said resultant number stored by said arithmetic processing means with said position feedback number to provide a positioning signal for said output while completely discarding said command input number to prevent positioning of the output in accordance with the received command input number.

2. In a numerical control system, means for storing a zero offset number having a plurality of digit positions in decimal form, means for converting said zero offset number to a binary coded form at least one digit position at a time, storage means for storing in binary coded form at least one digit position at a time, a command input number having a plurality of digit positions together with sign information associated with said command input number, and for storing at least the corresponding digit position of said zero offset number after conversion thereof to binary coded form by said converting means, arithmetic processing means connected with said storage means for adding the command input number in said storage means to the zero offset input number in said storage means in response to positive sign information in said storage means and for subtracting said command input number in said storage means from the zero offset number in said storage means in response to negative sign information in said storage means, and for storing the resultant number, means for receiving a position feedback number in accordance with the position of an output, and means for comparing said resultant number stored by said arithmetic processing means with said position feedback number to provide a positioning signal for said output while completely discarding said command input number to prevent positioning of the output in accordance with the command input number.

3. In an arithmetic processing system, means for receiving a first input number having a plurality of digit positions and for receiving a zero offset input number having a plurality of digit positions, arithmetic processing means for selectively adding the command input number to the second input number as one alternative and selectively subtracting said command input number from said zero offset number as a second alternative, and in both of said alternatives processing said input numbers digit by digit beginning with the most significant digit positions of said numbers and storing the resultant number, and means for receiving sign information concerning said command input number and controlling said arithmetic processing means to carry out an addition operation of said input numbers in response to positive sign information and to carry out a subtraction operation in response to negative sign information.

4. In an arithmetic processing system, means for storing a first number having a plurality of digit positions in decimal form, means for converting said first number to a binary coded form at least one digit position at a time, storage means for storing in binary coded form at least one digit position at a time, a second input number having a plurality of digit positions together with sign information associated with said command input number, and for storing at least the corresponding digit position of said zero offset number after conversion thereof to binary coded form by said converting means, and arithmetic processing means connected with said storage means for adding the second input number in said storage means to the zero offset input number in said storage means in response to positive sign information in said storage means and for subtracting said command input number in said storage means from the zero offset number in said storage means in response to negative sign information in said storage means, and for storing the resultant number.

5. In an arithmetic processing system, means for storing successive digit positions beginning with the most significant digit position of first and second binary coded decimal numbers each having a plurality of corresponding digit positions, means for adding the successively stored corresponding digit positions of the first and second numbers beginning with the most significant digit position and for including in the results of the successive additions an increase of one except with respect to the least significant digit position and for storing the results of the successive additions, and for generating a borrow signal with respect to any digit position where the result including the increase of one is equal to or greater than ten, and means responsive to the absence of a borrow signal with respect to any digit position to subtract a one from the stored result with respect to the next higher digit position.

6. In an arithmetic processing system, means for storing successive digit positions beginning with the most significant digit position of first and second binary coded decimal numbers each having a plurality of corresponding digit positions, means for subtracting the successively stored digits of the second number from the corresponding digits of the first number beginning with the most significant digit position and for storing the results, and for generating a borrow signal when the difference between the corresponding digits of the first and second numbers is algebraically less than or equal to zero, and means responsive to the presence of a borrow signal with respect to any digit position to subtract a one from the stored result with respect to the next higher digit position.

7. In a numerical control system, means for introducing a command input number in decimal form and for converting said command input number digit by digit to binary coded form, means responsive to positive sign information with respect to said command input number to add said command input number digit by digit to corresponding digits of a predetermined offset number, and responsive to negative sign information with respect to said command input number to subtract said command input number digit by digit from respective corresponding digits of said predetermined offset number, and in either case storing the resultant number, and means responsive to said resultant number to generate an output control signal.

8. In a numerical control system, means for storing a zero offset number having a plurality of digit positions in decimal form, means for converting said zero offset number to a binary coded form at least one digit position at a time, storage means for storing in binary coded form at least one digit at a time corresponding digit positions of said input numbers, means responsive to positive sign information with respect to said command input number to add said command input number in said storage means digit by digit to corresponding digits of said zero offset number in said storage means, and responsive to negative sign information with respect to said command input number to subtract said command input number in said storage means digit by digit from respective corresponding digits of said zero offset number in said storage means, and in either case storing the resultant number, and means responsive to said resultant number to generate an output control signal.

9. A numerical control system comprising:

means for receiving a command input number digit by digit beginning with the most significant digit, combining and storing means for algebraically combining said command input number in accordance with the sign thereof digit by digit with corresponding digits of a predetermined zero offset input number, and for storing the result of each such combining operation, means for generating a start signal in response to completion of the algebraic combining of successive sets of corresponding digits of said input numbers to automatically signal for the insertion into said receiving means of the next most significant digit of said command input number, and means responsive to the results in said combining and storing means for controlling an output.

10. In a numerical control system, input means for introducing an algebraic command input number and a positive zero offset number both in decimal form and for contemporaneously converting said input numbers digit by digit to binary coded form, processing means coupled to said input means for receiving successive corresponding digits of said input numbers in binary form and for algebraically combining said digits in accordance with the sign of said command input number to provide a resultant number, and means coupled to said processing means for storing the resultant number from said processing means digit by digit and for comparing said resultant number with a feedback number to generate an error signal of corrective polarity when the resultant and feedback numbers are different and for generating a zero signal when the resultant and feedback numbers are the same and for completely preventing control of the output of the system in accordance with the command input number.

11. In a numerical control system, a decimal number input device having respective series of contacts representing respective decimal digits, with each contact of each series representing a different digit position, respective common output bus lines connected to the successive contacts of the respective series, a decimal to binary number converter having respective common input terminals connected to the respective output bus lines, respective switch means representing respective digit positions and selectively engageable with the contacts of the respective series representing respective digit positions, and means for supplying enabling signals to the respective switch means in succession to transmit the selected digit of each digit position in succession to the common input terminals of said converter.

12. In a numerical control system, manually adjustable means for selectively registering a desired plural digit zero offset number, means controlled by said manually adjustable means for automatically generating a sequence of signals representing respective digit values of the zero offset number in a machine notation, tape input means having successive programmed command numbers recorded thereon in accordance with successive pre-computed output positions relative to a predetermined zero reference point, means for reading said tape input means digit by digit and for supplying signals representing the successive digit values in said machine notation, means for combining the signals from the reading means with the corresponding signals from the automatically generating means digit by digit in said machine notation, means for storing the successive command numbers from the tape input means only after combination thereof with said zero offset number to provide successive modified commands, while discarding said programmed command numbers, and means preventing positioning of the output in accordance with said programmed command numbers, and responsive to the successive modified commands to position the output only in accordance with the modified commands.

13. The system of claim 12 with said manually adjustable means being operative to register a zero offset number greater in value than the corresponding command number from the tape input means.

14. The system of claim 12 wherein said manually adjustable means is operative to store a zero offset number having a number of decimal code positions of the order of six.

15. The system of claim 12 with said manually adjustable means and said tape input means supplying respective numbers having approximately the same number of code positions in said machine notation.

16. The system of claim 12 with said combining means including means for generally adding a value of one to the successive combinations otherwise generated thereby, and means for modifying the resultant digit values in said storing means in accordance with borrow information from said combining means to provide the correct values for the successive modified commands.

References Cited

UNITED STATES PATENTS

| | | | |
|---|---|---|---|
| 2,740,106 | 3/1958 | Phelps | 340—147 |
| 3,015,806 | 1/1962 | Wang et al. | 340—147 |
| 3,172,026 | 3/1965 | Schuman | 318—28 |
| 3,244,866 | 4/1966 | Schauer | 235—176 |

ROBERT C. BAILEY, *Primary Examiner.*

R. M. RICKERT, *Assistant Examiner.*